(12) United States Patent
Hodgson et al.

(10) Patent No.: US 11,572,723 B2
(45) Date of Patent: Feb. 7, 2023

(54) VEHICLE INTERIOR COMPONENT

(71) Applicant: Shanghai Yanfeng Jinqiao Automotive Trim Systems Co. Ltd., Novi, MI (US)

(72) Inventors: Thomas Scott Hodgson, Holland, MI (US); Rick Alan Anderson, Grand Haven, MI (US); Dennis Jack VanHouten, Wyoming, MI (US); Jason Rutkowski, Jr., Grandville, MI (US)

(73) Assignee: Shanghai Yanfeng Jinqiao Automotive Triim Systems Co. Ltd., Novi, MI (US)

( * ) Notice: Subject to any disclaimer, the term of this patent is extended or adjusted under 35 U.S.C. 154(b) by 383 days.

(21) Appl. No.: 16/800,274

(22) Filed: Feb. 25, 2020

(65) Prior Publication Data

US 2020/0270920 A1 Aug. 27, 2020

Related U.S. Application Data

(60) Provisional application No. 62/811,272, filed on Feb. 27, 2019.

(51) Int. Cl.
*E05C 19/16* (2006.01)
*E05C 1/02* (2006.01)
(Continued)

(52) U.S. Cl.
CPC .............. *E05C 19/16* (2013.01); *B60R 7/06* (2013.01); *E05C 1/006* (2013.01); *E05C 1/02* (2013.01)

(58) Field of Classification Search
CPC . E05C 19/16; E05C 1/006; E05C 1/02; E05C 17/56; B60R 7/06; B60R 7/04;
(Continued)

(56) References Cited

U.S. PATENT DOCUMENTS

| 71,828 A | 12/1867 | Wells |
| 168,560 A | 10/1875 | Drescher |

(Continued)

FOREIGN PATENT DOCUMENTS

| AT | 512602 A1 | 9/2013 |
| BE | 669664 A | 12/1965 |

(Continued)

OTHER PUBLICATIONS

Non-Final Office Action from the United States Patent and Trademark Office for U.S. Appl. No. 15/890,953 dated Feb. 11, 2020 (in English) (10 Pages).

(Continued)

*Primary Examiner* — Kristina R Fulton
*Assistant Examiner* — Steven A Tullia

(57) ABSTRACT

A vehicle interior component is disclosed. The component may comprise a cover movable relative to a base between closed and open positions and a latch mechanism comprising a magnet arrangement for movement within the cover for engaged and disengaged states. The magnet arrangement may maintain the disengaged state after the cover is released from the base. A magnet of the base may retain the engaged state, a magnet may retain the disengaged state. The magnet arrangement may be concealed within the cover; a magnet arrangement may be concealed within the base. The base may comprise a first magnet on a sidewall and a second magnet on another sidewall; the cover may comprise a first magnet to engage the first magnet of the base and a second magnet to engage the second magnet of the base. The component may comprise a trim component, console, floor console, center console, or compartment.

20 Claims, 10 Drawing Sheets

(51) Int. Cl.
  *E05C 1/00* (2006.01)
  *B60R 7/06* (2006.01)
(58) Field of Classification Search
  CPC .............. B60R 7/046; Y10T 292/0834; Y10T
           292/0836; Y10T 292/084; Y10T
           292/0846; Y10T 292/096; Y10T
           292/1014; Y10T 292/0969; Y10T
                  292/09677
  USPC .................................. 296/37.8, 37.12, 24.34
  See application file for complete search history.

(56) References Cited

U.S. PATENT DOCUMENTS

| | | |
|---|---|---|
| 471,634 A | 9/1901 | Cushing |
| 984,204 A | 4/1906 | Erickson |
| 986,237 A | 6/1910 | Spink et al. |
| 1,111,362 A | 9/1914 | Carrigan et al. |
| 1,111,386 A | 9/1914 | Hutton et al. |
| 1,320,444 A | 9/1914 | Buczynski et al. |
| 1,664,476 A | 4/1928 | Geib et al. |
| 2,219,186 A | 10/1940 | Hornfeck et al. |
| 2,288,688 A | 7/1942 | William et al. |
| 2,342,848 A | 2/1944 | Endter et al. |
| 2,446,336 A | 8/1948 | Mark et al. |
| 2,468,969 A | 5/1949 | Galey et al. |
| 2,471,634 A | 5/1949 | Mark et al. |
| 2,475,226 A | 5/1949 | Ellis |
| 2,508,305 A | 5/1950 | Teetor et al. |
| 2,524,924 A | 10/1950 | Vincent et al. |
| 2,527,924 A | 10/1950 | Thorsten et al. |
| 2,565,891 A | 8/1951 | Sherman et al. |
| 2,584,480 A | 8/1951 | Manting |
| 2,586,900 A | 2/1952 | Wayne et al. |
| 2,648,884 A | 8/1953 | Elston et al. |
| 2,673,111 A | 3/1954 | Teetor et al. |
| 2,690,349 A | 9/1954 | Teetor et al. |
| 2,708,284 A | 5/1955 | Conklin et al. |
| 2,727,772 A | 5/1955 | Hamilton |
| 2,735,740 A | 2/1956 | Soans |
| 2,797,655 A | 7/1957 | Morehouse et al. |
| 2,889,164 A | 6/1959 | Clark et al. |
| 2,898,138 A | 8/1959 | Noord et al. |
| 2,913,605 A | 8/1959 | Johnson |
| 2,932,545 A | 4/1960 | Foley et al. |
| 2,970,857 A | 2/1961 | Squire et al. |
| 3,009,725 A | 11/1961 | Koch et al. |
| 3,066,964 A | 12/1962 | Georges et al. |
| 3,100,350 A | 8/1963 | Brown |
| 3,111,834 A | 11/1963 | Ronald et al. |
| 3,151,902 A | 10/1964 | Ahlgren et al. |
| 3,184,654 A | 5/1965 | Bey et al. |
| 3,204,154 A | 8/1965 | Crandell et al. |
| 3,264,424 A | 8/1966 | Max et al. |
| 3,288,511 A | 11/1966 | Tavano et al. |
| 3,309,696 A | 3/1967 | Alster et al. |
| 3,332,713 A | 7/1967 | De et al. |
| 3,334,936 A | 8/1967 | Maarten et al. |
| 3,372,443 A | 3/1968 | Daddona et al. |
| 3,376,615 A | 4/1968 | Heckman et al. |
| 3,416,336 A | 12/1968 | Ronald et al. |
| 3,468,576 A | 9/1969 | Beyer et al. |
| 3,468,579 A | 9/1969 | Tabor |
| 3,516,701 A | 6/1970 | Graham |
| 3,578,370 A | 5/1971 | Greytok |
| 3,596,858 A | 8/1971 | Curtis |
| 3,596,958 A | 8/1971 | Bowerman et al. |
| 3,611,219 A | 10/1971 | Iwami et al. |
| 3,620,560 A | 11/1971 | Peters |
| 3,635,511 A | 1/1972 | Waller et al. |
| 3,647,165 A | 3/1972 | Whitla et al. |
| 3,658,370 A | 4/1972 | Wang et al. |
| 3,744,833 A | 7/1973 | Berducone |
| 3,782,147 A | 1/1974 | Hallmann |
| 3,790,197 A | 2/1974 | Parker |
| 3,822,906 A | 7/1974 | Gaines |
| 3,831,986 A | 8/1974 | Kobayashi |
| 3,860,277 A | 1/1975 | Wang |
| 3,934,909 A | 1/1976 | Van Natter |
| 3,992,689 A | 11/1976 | Kaplow |
| 4,062,548 A | 12/1977 | Kagata |
| 4,099,755 A | 7/1978 | Anderson |
| 4,155,576 A | 5/1979 | Kennon |
| 4,195,236 A | 3/1980 | Kalinichenko et al. |
| 4,222,021 A | 9/1980 | Bunker, Jr. |
| 4,256,340 A | 3/1981 | Dunchock |
| 4,262,830 A | 4/1981 | Haves |
| 4,265,002 A | 5/1981 | Hosken |
| 4,268,076 A | 5/1981 | Itoi |
| 4,270,781 A | 6/1981 | Nishimura |
| 4,301,623 A | 11/1981 | Demukai |
| 4,355,837 A | 10/1982 | Shimizu et al. |
| 4,363,403 A | 12/1982 | Raucci, Jr. et al. |
| 4,364,019 A | 12/1982 | Hutter |
| 4,380,162 A | 4/1983 | Woolfson |
| 4,397,166 A | 8/1983 | Paar |
| 4,428,607 A | 1/1984 | Levine |
| 4,518,180 A | 5/1985 | Kleefeldt et al. |
| 4,518,181 A | 5/1985 | Yamada |
| 4,569,544 A | 2/1986 | Escaravage |
| 4,597,598 A | 7/1986 | Bascou |
| 4,660,871 A | 4/1987 | Arakawa et al. |
| 4,669,766 A | 6/1987 | Hanchett, Jr. et al. |
| 4,686,841 A | 8/1987 | Prunbauer et al. |
| 4,696,550 A | 9/1987 | Shionoya |
| 4,697,903 A | 10/1987 | Koda et al. |
| 4,703,586 A | 11/1987 | Smith et al. |
| 4,732,432 A | 3/1988 | Keil et al. |
| 4,763,936 A | 8/1988 | Rogakos et al. |
| 4,766,276 A | 8/1988 | Clark et al. |
| 4,796,932 A | 1/1989 | Tame |
| 4,815,304 A | 3/1989 | Kesselman |
| 4,840,411 A | 6/1989 | Sowersby |
| 4,848,809 A | 7/1989 | Escaravage |
| 4,861,089 A | 8/1989 | Compeau et al. |
| 4,867,496 A | 9/1989 | Thomas |
| 4,875,823 A | 10/1989 | Fuse et al. |
| 4,893,478 A | 1/1990 | Kruck et al. |
| 4,895,640 A | 1/1990 | Jackson |
| 4,901,261 A | 2/1990 | Fuhs |
| 4,919,464 A | 4/1990 | Richards |
| 4,927,196 A | 5/1990 | Girard et al. |
| 4,940,207 A | 7/1990 | Katsuyama |
| 4,958,508 A | 9/1990 | Lin |
| 4,964,661 A | 10/1990 | Cadwell et al. |
| 4,973,020 A | 11/1990 | Canadas |
| 4,978,478 A | 12/1990 | Vonderau et al. |
| 4,982,303 A | 1/1991 | Krenz |
| 5,033,789 A | 7/1991 | Hayashi et al. |
| 5,046,340 A | 9/1991 | Weinerman et al. |
| 5,067,625 A | 11/1991 | Numata |
| 5,076,623 A | 12/1991 | Richards |
| 5,116,099 A | 5/1992 | Kwasnik et al. |
| 5,128,829 A | 7/1992 | Loew |
| 5,175,672 A | 12/1992 | Conner et al. |
| 5,180,198 A | 1/1993 | Nakamura et al. |
| 5,188,405 A | 2/1993 | Maccaferri |
| 5,210,906 A | 5/1993 | Aihara et al. |
| 5,222,775 A | 6/1993 | Kato |
| 5,253,142 A | 10/1993 | Weng |
| 5,305,623 A | 4/1994 | Kello |
| 5,309,680 A | 5/1994 | Kiel |
| 5,351,812 A | 10/1994 | Eagon |
| 5,367,891 A | 11/1994 | Furuyama |
| 5,389,920 A | 2/1995 | DeLand et al. |
| 5,406,340 A | 4/1995 | Hoff |
| 5,409,275 A | 4/1995 | Yoshida et al. |
| 5,411,302 A | 5/1995 | Shimada |
| 5,413,391 A | 5/1995 | Clavin et al. |
| 5,429,400 A | 7/1995 | Kawaguchi et al. |
| 5,466,166 A | 11/1995 | Law et al. |
| 5,485,733 A | 1/1996 | Hoffman |
| 5,488,522 A | 1/1996 | Peace et al. |
| 5,497,296 A | 3/1996 | Satou et al. |

(56) References Cited

U.S. PATENT DOCUMENTS

| | | |
|---|---|---|
| 5,498,040 A | 3/1996 | Silye |
| 5,510,953 A | 4/1996 | Merkel |
| 5,515,237 A | 5/1996 | Ogami et al. |
| 5,518,282 A | 5/1996 | Sawada |
| 5,520,313 A | 5/1996 | Toshihide |
| 5,544,925 A | 8/1996 | Ikeda |
| 5,555,157 A | 9/1996 | Moller et al. |
| 5,570,915 A | 11/1996 | Asadurian |
| 5,574,625 A | 11/1996 | Ohgami et al. |
| 5,576,929 A | 11/1996 | Uchiyama et al. |
| 5,580,107 A | 12/1996 | Howell |
| 5,612,831 A | 3/1997 | Gallo et al. |
| 5,620,226 A | 4/1997 | Sautter, Jr. |
| 5,631,618 A | 5/1997 | Trumper et al. |
| 5,632,515 A | 5/1997 | Dowling |
| 5,642,636 A | 7/1997 | Mitsui |
| 5,647,562 A | 7/1997 | Lumbis et al. |
| 5,647,652 A | 7/1997 | Zalewski et al. |
| 5,706,332 A | 1/1998 | Nagai |
| 5,715,815 A | 2/1998 | Lorenzen et al. |
| 5,721,669 A | 2/1998 | Becker et al. |
| 5,737,185 A | 4/1998 | Morrison et al. |
| 5,740,012 A | 4/1998 | Choi |
| 5,765,884 A | 6/1998 | Armbruster |
| 5,782,512 A | 7/1998 | Cargnoni |
| 5,791,442 A | 8/1998 | Arnold |
| 5,809,520 A | 9/1998 | Edwards et al. |
| 5,812,370 A | 9/1998 | Moore et al. |
| 5,816,080 A | 10/1998 | Jeziorowski |
| 5,818,182 A | 10/1998 | Viswanadham et al. |
| 5,825,616 A | 10/1998 | Howell et al. |
| 5,841,631 A | 11/1998 | Shin et al. |
| 5,893,478 A | 4/1999 | Maruoka |
| 5,927,772 A | 7/1999 | Antonucci et al. |
| 5,941,104 A | 8/1999 | Sadler |
| 5,959,833 A | 9/1999 | Youens |
| 5,969,941 A | 10/1999 | Cho |
| 5,975,661 A | 11/1999 | Jeziorowski et al. |
| 5,984,383 A | 11/1999 | Parikh et al. |
| 5,996,831 A | 12/1999 | Teok |
| 6,010,344 A | 1/2000 | Muramatsu et al. |
| 6,048,006 A | 4/2000 | Antonucci et al. |
| 6,049,453 A | 4/2000 | Hulsebosch |
| 6,053,546 A | 4/2000 | Frolov |
| 6,062,623 A | 5/2000 | Lemmen |
| 6,068,307 A | 5/2000 | Murphy |
| 6,076,868 A | 6/2000 | Roger, Jr. et al. |
| 6,113,161 A | 9/2000 | Jung et al. |
| 6,115,239 A | 9/2000 | Kim |
| 6,129,395 A | 10/2000 | Schlesener et al. |
| 6,139,073 A | 10/2000 | Heffner et al. |
| 6,151,486 A | 11/2000 | Holshouser et al. |
| 6,176,528 B1 | 1/2001 | Taga |
| 6,256,194 B1 | 7/2001 | Choi et al. |
| 6,264,273 B1 | 7/2001 | Waters, Sr. |
| 6,267,420 B1 | 7/2001 | Miyagawa |
| 6,324,052 B1 | 11/2001 | Azima et al. |
| 6,327,879 B1 | 12/2001 | Malsom |
| 6,366,440 B1 | 4/2002 | Kung |
| 6,370,376 B1 | 4/2002 | Sheath |
| 6,386,599 B1 | 5/2002 | Chevalier |
| 6,460,902 B1 | 10/2002 | Kyle |
| 6,463,773 B1 | 10/2002 | Dimig |
| 6,467,903 B1 | 10/2002 | Back |
| 6,471,260 B1 | 10/2002 | Weinerman et al. |
| 6,474,120 B1 | 11/2002 | Wadsworth et al. |
| 6,480,377 B2 | 11/2002 | Genest et al. |
| 6,510,048 B2 | 1/2003 | Rubenson et al. |
| 6,542,372 B1 | 4/2003 | Paquin et al. |
| 6,588,811 B1 | 7/2003 | Ferguson |
| 6,616,205 B2 | 9/2003 | Bruhnke et al. |
| 6,640,398 B2 | 11/2003 | Hoffman |
| 6,653,919 B2 | 11/2003 | Shih-Chung et al. |
| 6,659,516 B2 | 12/2003 | Wang et al. |
| 6,684,904 B2 | 2/2004 | Ito |
| 6,705,140 B1 | 3/2004 | Dimig et al. |
| 6,715,815 B2 | 4/2004 | Toppani |
| 6,736,438 B1 | 5/2004 | Wieclawski |
| 6,747,537 B1 | 6/2004 | Mosteller |
| 6,765,330 B2 | 7/2004 | Baur |
| 6,832,100 B2 | 12/2004 | Hsieh |
| 6,842,332 B1 | 1/2005 | Rubenson et al. |
| 6,883,680 B2 | 4/2005 | Hirose |
| D506,120 S | 6/2005 | Straka, Jr. et al. |
| 6,929,291 B2 | 8/2005 | Chen |
| 6,971,147 B2 | 12/2005 | Halstead |
| 7,042,713 B2 | 5/2006 | Nicolosi |
| 7,082,035 B2 | 7/2006 | Kim |
| 7,092,070 B2 | 8/2006 | McCullough et al. |
| 7,250,207 B1 | 7/2007 | Heal et al. |
| 7,259,970 B2 | 8/2007 | Nakayabu |
| 7,261,331 B2 | 8/2007 | Lin |
| 7,265,470 B1 | 9/2007 | Paden et al. |
| 7,267,378 B2 | 9/2007 | Drumm |
| 7,286,369 B2 | 10/2007 | Yaor |
| 7,332,990 B2 | 2/2008 | Lo et al. |
| 7,390,035 B2 | 6/2008 | Karcz et al. |
| 7,486,165 B2 | 2/2009 | Ligtenberg et al. |
| 7,583,500 B2 * | 9/2009 | Ligtenberg ............ G06F 1/1616 |
| | | 361/147 |
| 7,591,395 B2 | 9/2009 | Hamaguchi |
| 7,637,543 B2 | 12/2009 | Ferguson |
| 7,724,113 B2 | 5/2010 | Fullerton et al. |
| 7,748,762 B2 | 7/2010 | Mayne, Jr. |
| 7,766,407 B2 | 8/2010 | Nakaya |
| 7,770,953 B2 | 8/2010 | Koarai |
| 7,775,567 B2 | 8/2010 | Ligtenberg et al. |
| 7,817,002 B2 | 10/2010 | Fullerton et al. |
| 7,889,036 B2 | 2/2011 | Fiedler |
| 7,931,313 B2 | 4/2011 | Carabalona |
| 8,004,393 B2 | 8/2011 | Haber |
| 8,052,181 B2 | 11/2011 | Nishida |
| 8,172,299 B2 | 5/2012 | Lota |
| 8,186,734 B2 | 5/2012 | Nakaya |
| 8,256,814 B2 | 9/2012 | Thorsell et al. |
| 8,373,526 B2 | 2/2013 | Fullerton et al. |
| 8,395,467 B2 | 3/2013 | Fullerton et al. |
| 8,403,382 B2 | 3/2013 | Della-Santa |
| 8,458,863 B2 | 6/2013 | Hunts |
| 8,482,394 B2 | 7/2013 | Nass et al. |
| 8,505,989 B2 | 8/2013 | Wells |
| 8,528,950 B2 | 9/2013 | Organek et al. |
| 8,540,292 B2 | 9/2013 | Ferguson |
| 8,672,368 B2 | 3/2014 | Grosdemouge |
| 8,794,473 B2 | 8/2014 | Kang |
| 8,801,054 B2 | 8/2014 | Ligtenberg et al. |
| 8,816,636 B2 | 8/2014 | Shinde et al. |
| 8,864,188 B2 | 10/2014 | Redgrave |
| 9,004,550 B2 | 4/2015 | Carabalona et al. |
| 9,257,245 B2 | 2/2016 | Sun et al. |
| 9,476,228 B2 | 10/2016 | Karcz et al. |
| 9,573,529 B2 | 2/2017 | Hipshier et al. |
| 10,053,019 B2 | 8/2018 | Hodgson et al. |
| 10,059,271 B2 | 8/2018 | Anderson |
| 10,100,560 B2 | 10/2018 | Anderson et al. |
| 2001/0024039 A1 | 9/2001 | Lippoldt et al. |
| 2001/0035654 A1 | 11/2001 | Cetnar et al. |
| 2001/0045750 A1 | 11/2001 | Ji et al. |
| 2002/0017791 A1 | 2/2002 | Ji et al. |
| 2002/0043608 A1 | 4/2002 | Nakata et al. |
| 2002/0084666 A1 | 7/2002 | Toppani |
| 2002/0105400 A1 | 8/2002 | Underwood et al. |
| 2002/0105401 A1 | 8/2002 | Shih-Chung et al. |
| 2002/0112322 A1 | 8/2002 | Hoffman |
| 2002/0116794 A1 | 8/2002 | Hoffman |
| 2002/0121784 A1 | 9/2002 | Chevalier |
| 2002/0130128 A1 | 9/2002 | Berglund |
| 2002/0147026 A1 | 10/2002 | Hsieh |
| 2002/0153376 A1 | 10/2002 | Seidler |
| 2002/0158475 A1 | 10/2002 | Rice et al. |
| 2002/0167175 A1 | 11/2002 | Weyerstall et al. |
| 2003/0025339 A1 | 2/2003 | Vitry et al. |
| 2003/0035297 A1 | 2/2003 | Bingle et al. |
| 2003/0047955 A1 | 3/2003 | Bruhnke et al. |

(56) References Cited

U.S. PATENT DOCUMENTS

| | | |
|---|---|---|
| 2003/0053855 A1 | 3/2003 | Baur |
| 2003/0094024 A1 | 5/2003 | Dimig |
| 2003/0132234 A1 | 7/2003 | Hirose |
| 2003/0177796 A1 | 9/2003 | Dimig |
| 2003/0193199 A1 | 10/2003 | Talukdar et al. |
| 2004/0070214 A1 | 4/2004 | Queveau et al. |
| 2004/0113433 A1 | 6/2004 | Marzolf et al. |
| 2004/0118171 A1 | 6/2004 | Vitry et al. |
| 2004/0174670 A1 | 9/2004 | Huang et al. |
| 2004/0197713 A1 | 10/2004 | Ohfuji et al. |
| 2004/0222645 A1 | 11/2004 | Pirone et al. |
| 2005/0000327 A1 | 1/2005 | Monroig et al. |
| 2005/0018393 A1 | 1/2005 | Kuo et al. |
| 2005/0023847 A1 | 2/2005 | Van Damme et al. |
| 2005/0044904 A1 | 3/2005 | Horngren et al. |
| 2005/0047054 A1 | 3/2005 | Klees |
| 2005/0059443 A1 | 3/2005 | Pan et al. |
| 2005/0062296 A1 | 3/2005 | Lyon |
| 2005/0067840 A1 | 3/2005 | Koveal et al. |
| 2005/0083644 A1 | 4/2005 | Song |
| 2005/0097711 A1 | 5/2005 | Halstead |
| 2005/0115289 A1 | 6/2005 | Talukdar et al. |
| 2005/0128695 A1 | 6/2005 | Han |
| 2005/0133507 A1 | 6/2005 | Tanaka |
| 2005/0142936 A1 | 6/2005 | Sung et al. |
| 2005/0151381 A1 | 7/2005 | Durbin |
| 2005/0160777 A1 | 7/2005 | Baechle et al. |
| 2005/0167992 A1 | 8/2005 | Lo et al. |
| 2005/0183940 A1 | 8/2005 | Ichimaru |
| 2005/0200137 A1 | 9/2005 | Nelsen et al. |
| 2005/0236848 A1 | 10/2005 | Kim |
| 2006/0006674 A1 | 1/2006 | Kang et al. |
| 2006/0023408 A1 | 2/2006 | Schlesener et al. |
| 2006/0037965 A1 | 2/2006 | Hamaguchi |
| 2006/0038415 A1 | 2/2006 | Liu et al. |
| 2006/0049645 A1 | 3/2006 | Drumm |
| 2006/0071746 A1 | 4/2006 | Lylyharju |
| 2006/0097532 A1 | 5/2006 | Adams et al. |
| 2006/0108816 A1 | 5/2006 | Radu et al. |
| 2006/0175842 A1* | 8/2006 | Saitoh ............... E05C 19/163 292/251.5 |
| 2006/0290144 A1 | 12/2006 | Nakaya |
| 2007/0007775 A1 | 1/2007 | Gallas et al. |
| 2007/0133156 A1 | 6/2007 | Ligtenberg et al. |
| 2007/0138806 A1 | 6/2007 | Ligtenberg et al. |
| 2007/0159033 A1 | 7/2007 | McBroom et al. |
| 2007/0216173 A1 | 9/2007 | Vitry |
| 2007/0257496 A1 | 11/2007 | Spurr et al. |
| 2008/0136197 A1 | 6/2008 | Lin |
| 2008/0150341 A1 | 6/2008 | Salewski |
| 2008/0174127 A1 | 7/2008 | Kim et al. |
| 2008/0191494 A1 | 8/2008 | Carabalona et al. |
| 2008/0231060 A1 | 9/2008 | Carabalona et al. |
| 2008/0265588 A1 | 10/2008 | Carabalona |
| 2008/0309032 A1 | 12/2008 | Keane et al. |
| 2009/0021333 A1 | 1/2009 | Fiedler |
| 2009/0066103 A1 | 3/2009 | Koarai |
| 2009/0072565 A1 | 3/2009 | Mayne, Jr. |
| 2009/0079205 A1 | 3/2009 | Nishida |
| 2009/0174990 A1 | 7/2009 | Ligtenberg et al. |
| 2009/0218842 A1 | 9/2009 | Muller |
| 2009/0230699 A1 | 9/2009 | Carabalona |
| 2010/0032403 A1 | 2/2010 | Hajichristou et al. |
| 2010/0083580 A1 | 4/2010 | Lota |
| 2010/0171578 A1 | 7/2010 | Fiedler |
| 2010/0188177 A1 | 7/2010 | Inage |
| 2010/0254111 A1 | 10/2010 | Ligtenberg et al. |
| 2010/0283269 A1 | 11/2010 | Fiedler |
| 2010/0287741 A1 | 11/2010 | Fiedler |
| 2011/0007466 A1* | 1/2011 | Wang ............... G06F 3/0208 361/679.2 |
| 2011/0031766 A1 | 2/2011 | Huang et al. |
| 2011/0132907 A1 | 6/2011 | Hajichristou et al. |
| 2011/0167595 A1 | 7/2011 | Fiedler |
| 2011/0215605 A1 | 9/2011 | Spitler et al. |
| 2011/0215686 A1 | 9/2011 | Yang |
| 2012/0261937 A1* | 10/2012 | Buchheit ............... E05B 83/30 220/262 |
| 2012/0319422 A1* | 12/2012 | Kang ............... B60R 7/04 296/24.34 |
| 2013/0094142 A1 | 4/2013 | Ligtenbert et al. |
| 2014/0034080 A1* | 2/2014 | Paquet ............... A45C 13/1069 132/286 |
| 2014/0047677 A1 | 2/2014 | Trinh |
| 2014/0062103 A1 | 3/2014 | Gillis |
| 2014/0145453 A1 | 5/2014 | Zhang et al. |
| 2015/0054608 A1 | 2/2015 | Sun et al. |
| 2015/0137553 A1 | 5/2015 | Iman |
| 2015/0343956 A1 | 12/2015 | Hipshier et al. |
| 2016/0159289 A1 | 6/2016 | Gaudig |
| 2016/0304031 A1 | 10/2016 | Hipshier et al. |
| 2017/0050572 A1* | 2/2017 | Anderson ............... B60R 7/06 |
| 2017/0360171 A1* | 12/2017 | Weber ............... F16B 1/00 |
| 2018/0162281 A1 | 6/2018 | Anderson et al. |
| 2018/0162282 A1 | 6/2018 | Anderson et al. |

FOREIGN PATENT DOCUMENTS

| | | |
|---|---|---|
| CN | 103836324 A | 6/2014 |
| CN | 204172791 U | 2/2015 |
| CN | 204184264 U | 3/2015 |
| CN | 105105490 A | 12/2015 |
| CN | 105682503 A | 6/2016 |
| DE | 145325 C | 11/1903 |
| DE | 479949 C | 7/1929 |
| DE | 940451 C | 3/1956 |
| DE | 1157109 B | 11/1963 |
| DE | 1916694 U | 5/1965 |
| DE | 1968971 U | 9/1967 |
| DE | 1286933 B | 1/1969 |
| DE | 1903446 A1 | 9/1969 |
| DE | 1553540 A1 | 10/1969 |
| DE | 7121004 U | 9/1971 |
| DE | 2112425 A1 | 9/1972 |
| DE | 2323058 A1 | 11/1974 |
| DE | 2455520 A1 | 5/1976 |
| DE | 2918782 A1 | 1/1980 |
| DE | 2921613 A1 | 9/1980 |
| DE | 8028776 U1 | 7/1981 |
| DE | 3521979 A1 | 1/1987 |
| DE | 8902181 U1 | 5/1989 |
| DE | 3804176 A1 | 8/1989 |
| DE | 4130847 A1 | 3/1993 |
| DE | 4337426 A1 | 5/1995 |
| DE | 69206404 T2 | 6/1996 |
| DE | 29622577 U1 | 4/1997 |
| DE | 19642071 A1 | 4/1998 |
| DE | 19829958 A1 | 1/2000 |
| DE | 19840620 C1 | 4/2000 |
| DE | 19911792 A1 | 9/2000 |
| DE | 19943041 A1 | 3/2001 |
| DE | 19961893 A1 | 7/2001 |
| DE | 19953898 A1 | 8/2001 |
| DE | 10009291 A1 | 9/2001 |
| DE | 10104010 A1 | 8/2002 |
| DE | 20215067 U1 | 1/2003 |
| DE | 19738181 C2 | 4/2003 |
| DE | 10213772 A1 | 10/2003 |
| DE | 10216225 A1 | 10/2003 |
| DE | 10247453 A1 | 4/2004 |
| DE | 10312269 A1 | 9/2004 |
| DE | 10325105 B3 | 12/2004 |
| DE | 10339363 A1 | 3/2005 |
| DE | 202004019166 U1 | 3/2005 |
| DE | 102004015718 B3 | 5/2005 |
| DE | 202004001958 U1 | 6/2005 |
| DE | 102005007042 A1 | 11/2005 |
| DE | 102004049024 B3 | 4/2006 |
| DE | 102004054028 A1 | 5/2006 |
| DE | 102004056197 A1 | 5/2006 |
| DE | 102005011158 A1 | 9/2006 |
| DE | 102007047537 A1 | 4/2009 |
| DE | 102008050866 A1 | 4/2010 |
| DE | 102008057436 A1 | 5/2010 |

(56) References Cited

FOREIGN PATENT DOCUMENTS

| | | | |
|---|---|---|---|
| DE | 102009006206 A1 | 7/2010 | |
| DE | 102009037036 A1 | 2/2011 | |
| DE | 102009059050 A1 | 6/2011 | |
| DE | 102011012434 A1 | 8/2012 | |
| DE | 102011103554 A1 | 12/2012 | |
| DE | 102009007723 B4 | 1/2013 | |
| DE | 102013014155 A1 | 4/2014 | |
| DE | 102010039821 B4 | 5/2014 | |
| DE | 202016100610 U1 | 2/2016 | |
| DE | 102015105977 B3 | 5/2016 | |
| DE | 102015009585 A1 | 1/2017 | |
| DE | 102015113811 A1 | 2/2017 | |
| DE | 102015104722 B4 | 5/2017 | |
| DE | 102017104476 A1 * | 9/2018 | ............ E05B 81/56 |
| EP | 0099223 A2 | 1/1984 | |
| EP | 0367000 A2 | 5/1990 | |
| EP | 0490468 A1 | 6/1992 | |
| EP | 0564441 A1 | 10/1993 | |
| EP | 0575962 A1 | 12/1993 | |
| EP | 0825628 A1 | 2/1998 | |
| EP | 0559267 B1 | 4/1999 | |
| EP | 1050649 A1 | 11/2000 | |
| EP | 1411193 A2 | 4/2004 | |
| EP | 1473511 A2 | 11/2004 | |
| EP | 1574147 A1 | 9/2005 | |
| EP | 1638206 A2 | 3/2006 | |
| EP | 1427648 B1 | 7/2006 | |
| EP | 1764266 A1 | 3/2007 | |
| EP | 1916365 A2 | 4/2008 | |
| EP | 1929896 A1 | 6/2008 | |
| EP | 2027791 A1 | 2/2009 | |
| EP | 2045423 A2 | 4/2009 | |
| EP | 1329581 B1 | 1/2011 | |
| EP | 2284341 A2 | 2/2011 | |
| EP | 2314810 A2 | 4/2011 | |
| EP | 2527573 A1 | 11/2012 | |
| EP | 1846904 B1 | 10/2015 | |
| EP | 1880073 B1 | 6/2016 | |
| FR | 369664 A | 11/1929 | |
| FR | 1238808 A | 8/1960 | |
| FR | 2724609 A1 | 3/1996 | |
| FR | 2852794 A1 | 10/2004 | |
| FR | 2862948 A1 | 6/2005 | |
| FR | 2867361 A1 | 9/2005 | |
| FR | 2880600 A1 * | 7/2006 | ............ B60R 7/06 |
| FR | 2885380 A1 | 11/2006 | |
| FR | 2896741 A1 * | 8/2007 | ............ B60R 7/02 |
| FR | 2919584 A1 | 2/2009 | |
| FR | 2931642 A1 | 12/2009 | |
| FR | 2961763 A1 | 12/2011 | |
| FR | 2973665 A1 | 10/2012 | |
| FR | 3014927 A1 | 6/2015 | |
| FR | 3021686 A1 * | 12/2015 | ............ E05B 81/56 |
| GB | 573454 A | 11/1945 | |
| GB | 529903 A | 9/1949 | |
| GB | 1094757 A | 12/1967 | |
| GB | 1207641 A | 10/1970 | |
| GB | 2236139 A | 3/1991 | |
| GB | 2264975 A | 9/1993 | |
| GB | 2397616 A | 7/2004 | |
| GB | 2460775 A | 12/2009 | |
| JP | S5829759 U | 2/1983 | |
| JP | S5923596 U | 2/1984 | |
| JP | 56095336 U | 6/1985 | |
| JP | S63143668 U | 9/1988 | |
| JP | H0381242 U | 8/1991 | |
| JP | H04185880 A | 7/1992 | |
| JP | H05340149 A | 12/1993 | |
| JP | H0816423 B2 | 2/1996 | |
| JP | H10165208 A | 6/1998 | |
| JP | H11107608 A | 4/1999 | |
| JP | H11252232 A | 9/1999 | |
| JP | 3002189 B1 | 1/2000 | |
| JP | 2000142243 A | 5/2000 | |
| JP | 2000325116 A | 11/2000 | |
| JP | 2001219012 A | 8/2001 | |
| JP | 2002219012 A | 8/2002 | |
| JP | 2003148029 A | 5/2003 | |
| JP | 2007261435 A | 10/2007 | |
| JP | 2007530184 A | 11/2007 | |
| JP | 2011107608 A | 6/2011 | |
| KR | 20030086387 A | 11/2003 | |
| KR | 100931325 B1 * | 8/2009 | ............ B65D 55/00 |
| KR | 20110082382 A * | 1/2010 | ............ B60R 7/06 |
| KR | 20100093757 A | 8/2010 | |
| NL | 1036087 C | 4/2010 | |
| RO | 118893 B | 12/2003 | |
| WO | 2003018423 A1 | 3/2003 | |
| WO | 2003085833 A2 | 10/2003 | |
| WO | 2004083578 A1 | 9/2004 | |
| WO | 2005094625 A1 | 10/2005 | |
| WO | 2005096264 A1 | 10/2005 | |
| WO | 2006040531 A1 | 4/2006 | |
| WO | 2006088775 A2 | 8/2006 | |
| WO | 2006094491 A1 | 9/2006 | |
| WO | 2006122151 A2 | 11/2006 | |
| WO | 2007129484 A1 | 11/2007 | |
| WO | 2008006357 A2 | 1/2008 | |
| WO | 2010037442 A1 | 4/2010 | |
| WO | 2011072427 A1 | 6/2011 | |
| WO | 2012113550 A1 | 8/2012 | |
| WO | 2015025321 A1 | 2/2015 | |
| WO | 2015092249 A2 | 6/2015 | |
| WO | WO-2015125687 A1 * | 8/2015 | ............ B60R 7/06 |
| WO | 2016094844 A1 | 6/2016 | |

OTHER PUBLICATIONS

Non-Final Office Action from the United States Patent and Trademark Office for U.S. Appl. No. 15/890,980 dated Jan. 2, 2020 (in English) (13 pages).

Extended European Search Report from the European Patent Office for EP Patent Application No. 17800110.3 dated Sep. 24, 2019 (in English) (8 pages).

Notification of Transmittal of International Search Report and Written Opinion of the International Searching Authority (PCT/ISA/220) with International Search Report (PCT/ISA/210) and Written Opinion of the International Searching Authority (PCT/ISA/237) for International Application No. PCT/US2017/033149 dated Aug. 16, 2017 (15 pages).

* cited by examiner

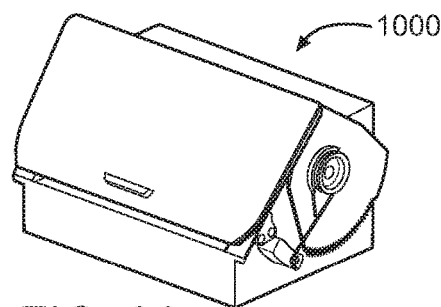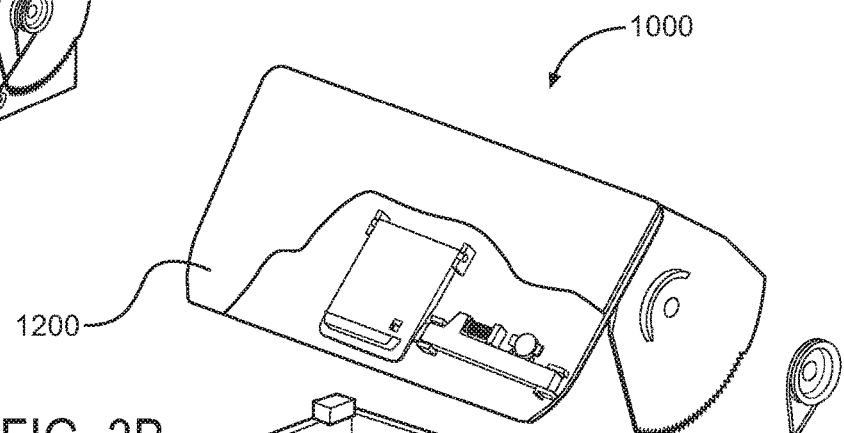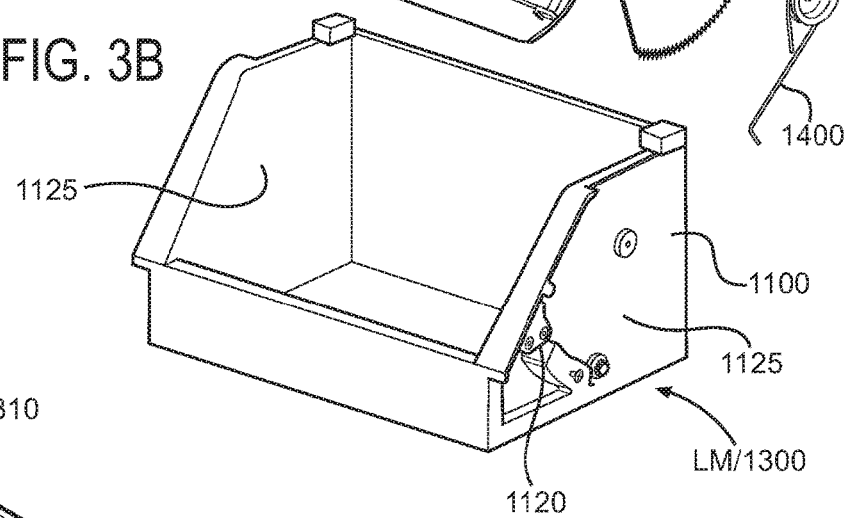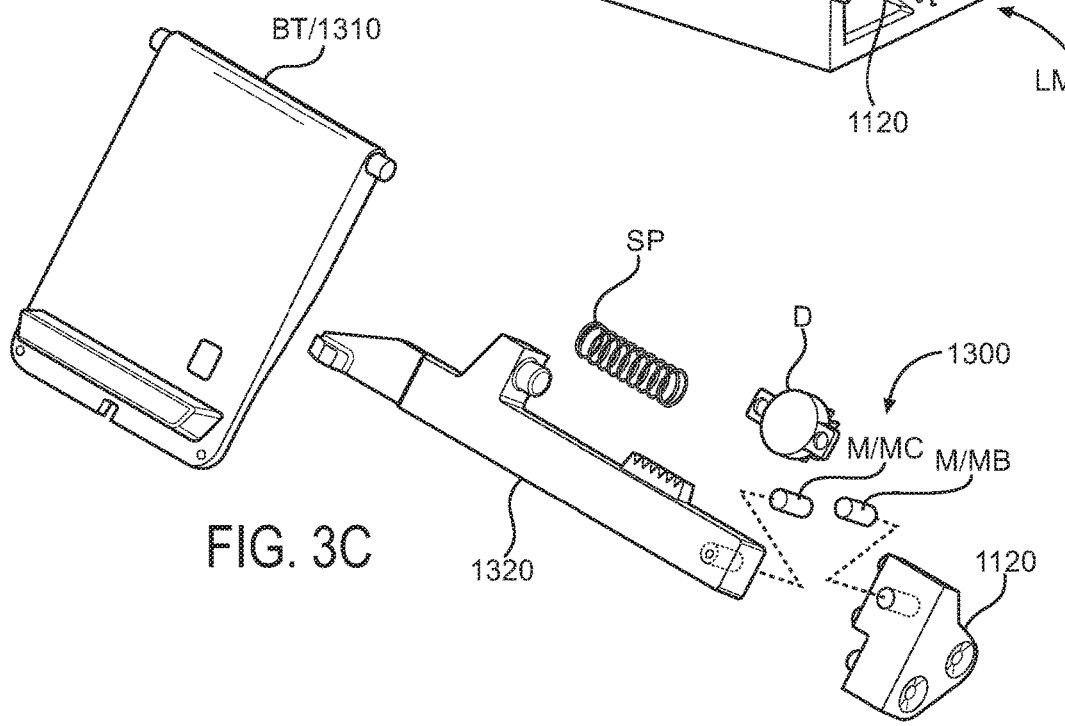

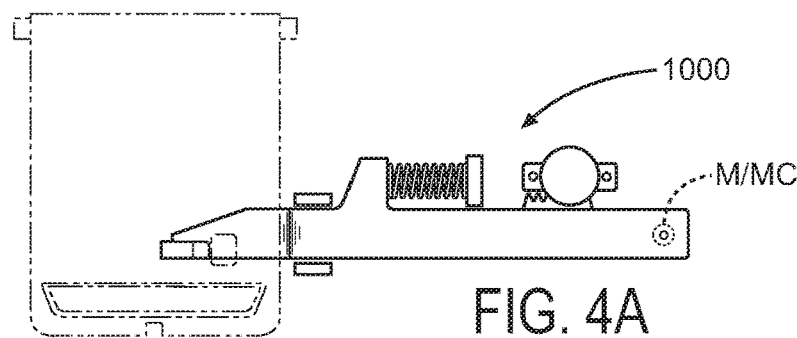
FIG. 4A
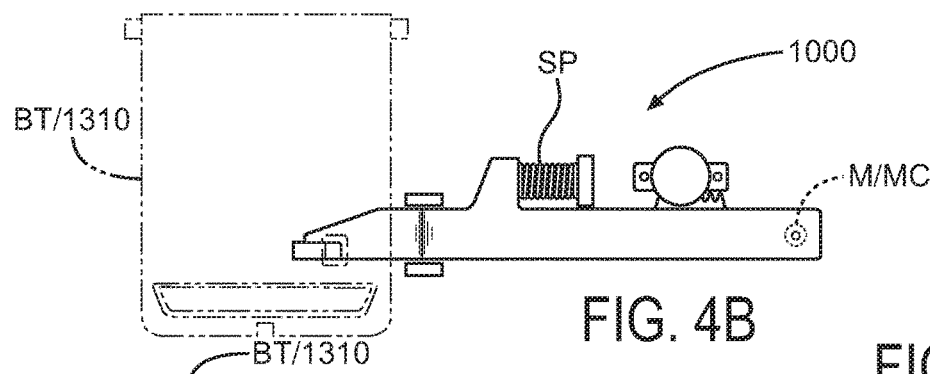
FIG. 4B
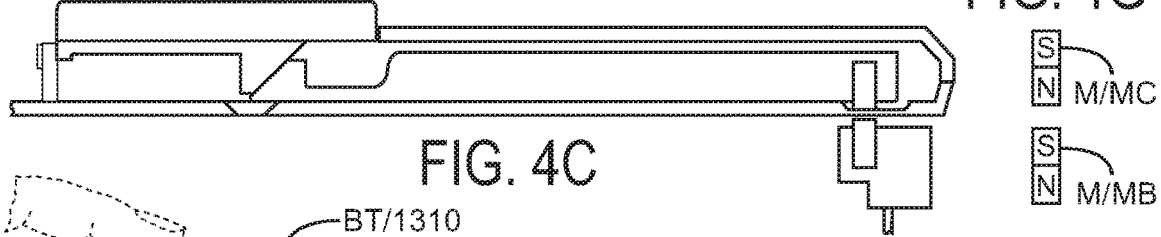
FIG. 4C
FIG. 4G
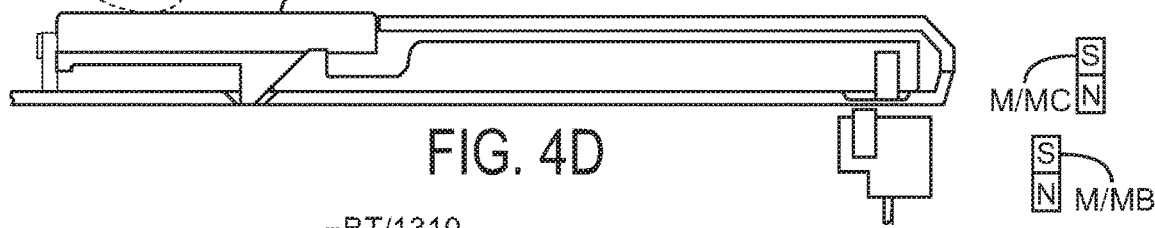
FIG. 4D
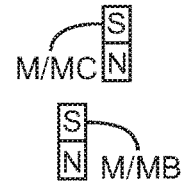
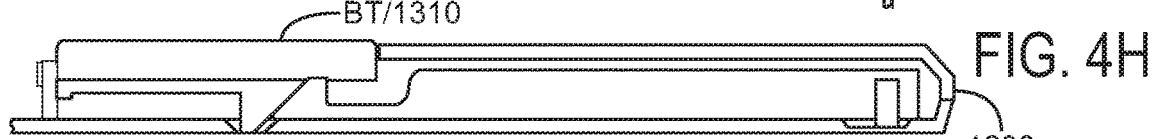
FIG. 4E
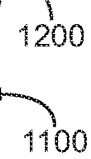
FIG. 4H
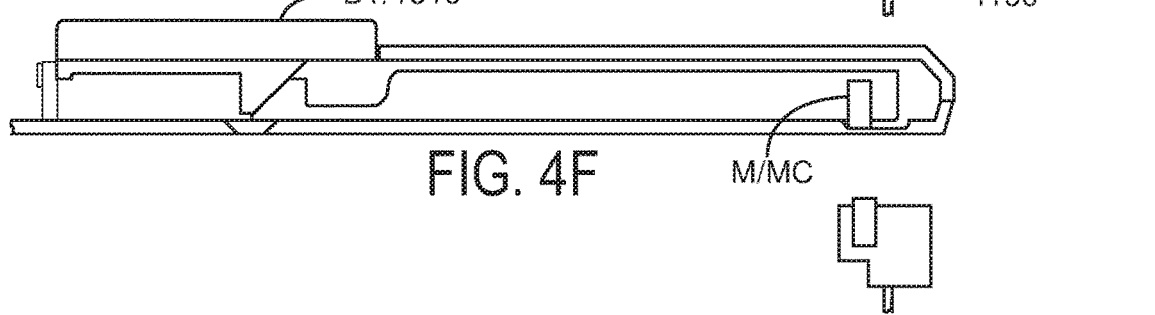
FIG. 4F
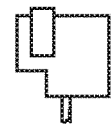

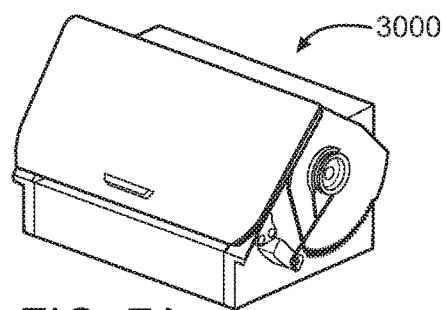
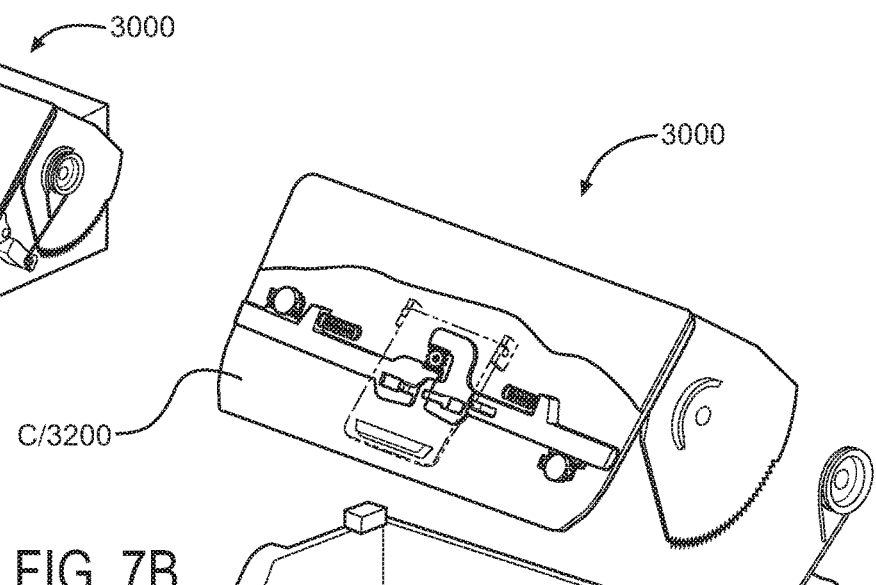
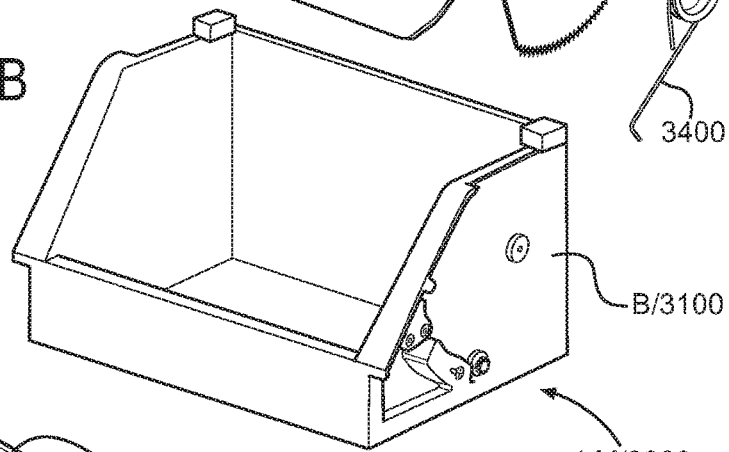
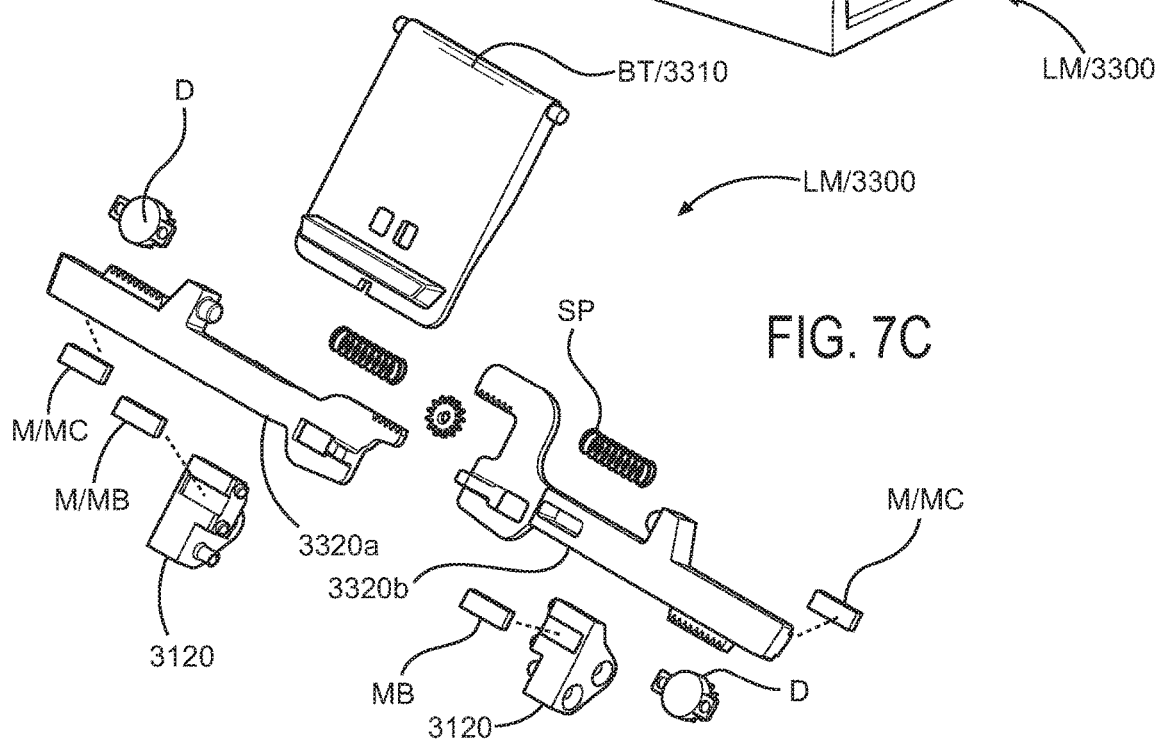

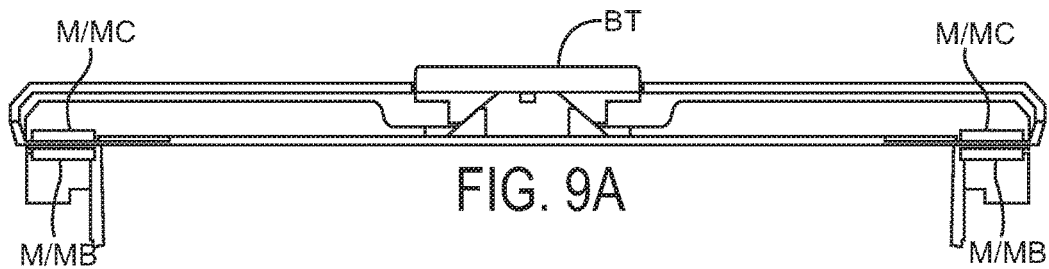
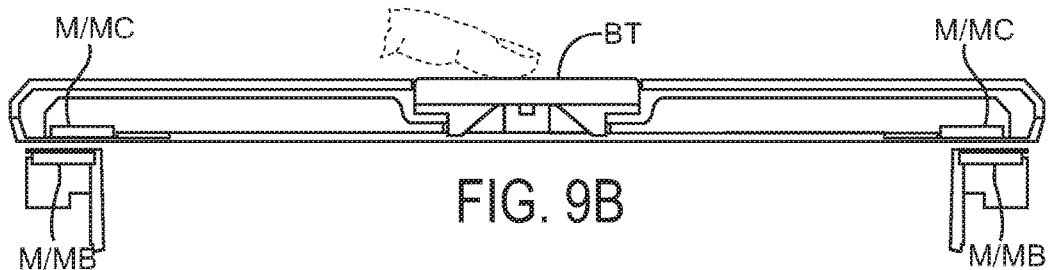
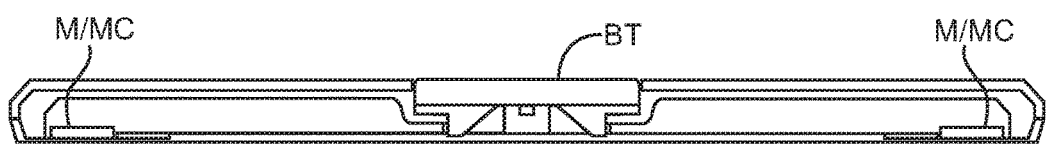
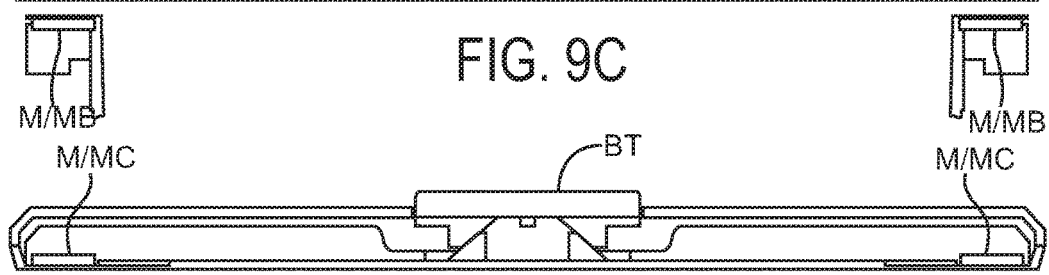

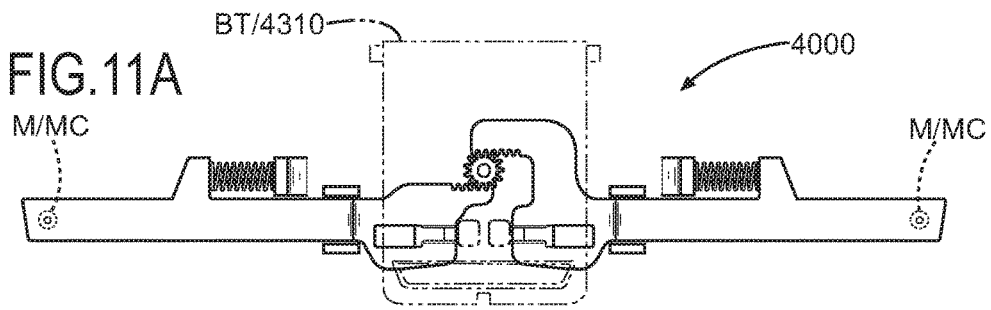
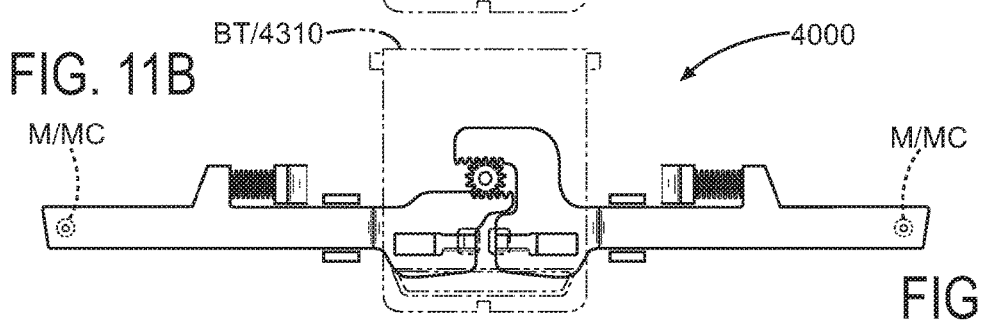
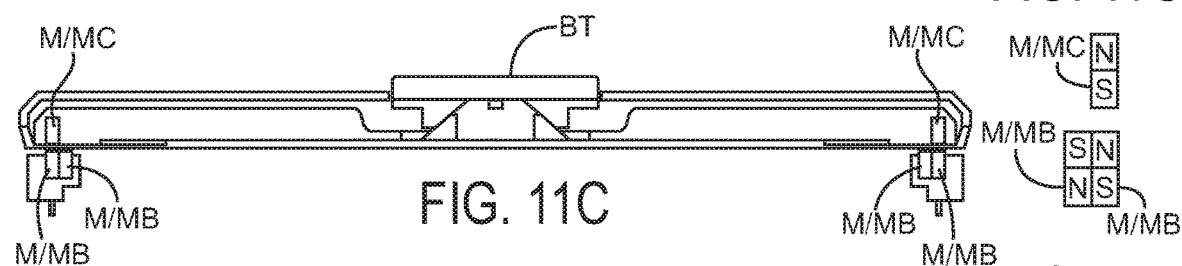
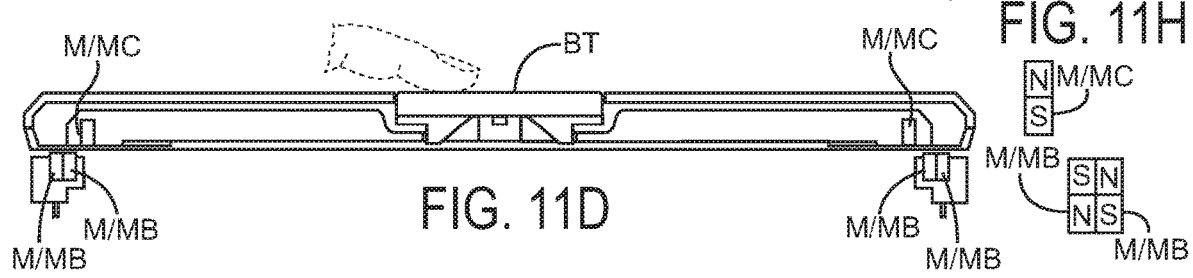
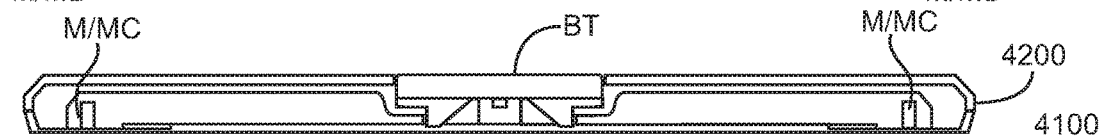
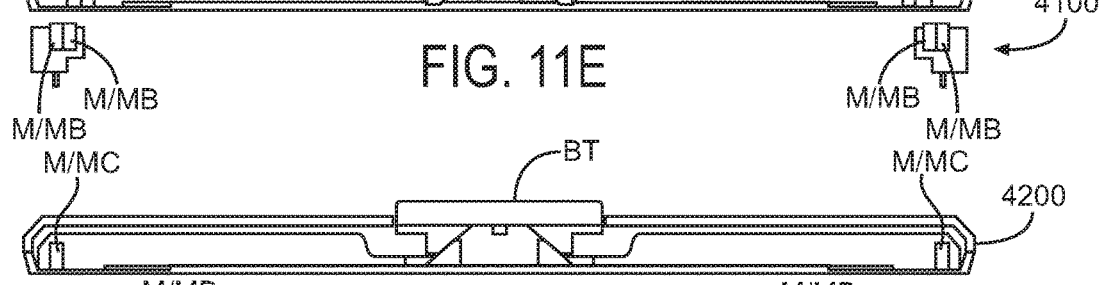

VEHICLE INTERIOR COMPONENT

CROSS-REFERENCE TO RELATED APPLICATION

The present application claims priority to and incorporates by reference in full the following patent application: U.S. Provisional Patent Application No. 62/811,272 titled "VEHICLE INTERIOR COMPONENT" filed Feb. 27, 2019.

FIELD

The present invention relates to a vehicle interior component.

BACKGROUND

It is well known to provide in a vehicle interior a component comprising a base with a compartment and a cover movable relative to the base to facilitate access to the compartment.

It would be advantageous to provide an improved component for a vehicle interior configured for improved functionality and operation comprising features (and combinations of features) as shown and described in the present application including features relating to a base, a cover arrangement and a latch mechanism to secure the cover to the base.

SUMMARY

The present invention relates to a vehicle interior component comprising: a base; a cover movable relative to the base from a closed position to an open position; and a latch mechanism. The latch mechanism may comprise a magnet arrangement configured for movement within the cover for an engaged state and a disengaged state to release the cover from the closed position. The magnet arrangement may be configured to maintain the disengaged state after the cover has been released from the base. The latch mechanism may comprise a magnet arrangement of the base comprising at least one magnet on the base. The magnet arrangement of the base may comprise a first magnet and a second magnet; the first magnet may be configured to retain at least one magnet of the cover in the engaged state, the second magnet may be configured to retain at least one magnet of the cover in the disengaged state. The magnet arrangement of the cover may be configured to be concealed within the cover; the magnet arrangement of the base may be configured to be concealed within the base. The base may comprise a first sidewall and a second sidewall; the magnet arrangement of the base may comprise a first magnet on the first sidewall of the base and a second magnet on the second sidewall of the base; the magnet arrangement of the cover may comprise a first magnet and a second magnet; the first magnet of the cover may be configured to engage the first magnet of the base and the second magnet of the cover may be configured to engage the second magnet of the base. The cover may comprise a button for the latch mechanism configured to release the cover from the base; the magnet arrangement of the cover may be configured to move away from the button to release the cover from the base. The latch mechanism may comprise a damper for the magnet arrangement of the cover; the damper may be configured to slow movement of the magnet arrangement of the cover from the disengaged state to the engaged state. The component may comprise at least one of (a) a vehicle trim component, (b) a console, (c) a floor console, (d) a center console, (e) a storage compartment.

The present invention relates to a vehicle interior component comprising: a base; a cover movable relative to the base from a closed position to an open position; and a latch mechanism. The latch mechanism may comprise a magnet arrangement configured for movement within the cover for an engaged state and a disengaged state to release the cover from the closed position. The magnet arrangement within the cover may comprise a first magnet and a second magnet. The first magnet may be configured for movement relative to the second magnet to release the cover from the base. The first magnet and the second magnet may be configured to move apart to release the cover from the base. The first magnet may be configured to move toward the second magnet to release the cover from the base. The latch mechanism may comprise a linkage; the linkage may be configured to link movement the first magnet and the second magnet. The linkage may comprise a rack and pinion mechanism. The latch mechanism may comprise a spring; the spring may be configured to facilitate relative movement of the first magnet and the second magnet. The cover may comprise a button for the latch mechanism configured to release the cover from the base; actuation of the button for the latch mechanism may be configured to translate the first magnet; actuation of the button for the latch mechanism may be configured to translate the second magnet. The component may comprise at least one of (a) a vehicle trim component, (b) a console, (c) a floor console, (d) a center console, (e) a storage compartment.

The present invention relates to a vehicle interior component comprising: a base; a cover movable relative to the base from a closed position to an open position; and a latch mechanism. The latch mechanism may comprise a magnet arrangement configured for movement within the cover for an engaged state and a disengaged state to release the cover from the closed position. The cover may comprise a button; the cover may comprise an arm configured to be actuated by the button; the arm may be configured to retain the cover to the base until actuated to movement by the button; the arm may be configured for movement from the button to release the cover from the base. The latch mechanism may comprise a magnetic latch; the magnetic latch may comprise the magnet arrangement; the magnet arrangement may comprise at least one magnet for the arm; the button may be configured to actuate the magnetic latch; actuation of the magnetic latch by the button may be configured to move at least one magnet of the arm relative to the base to actuate movement of the cover from the closed position to the open position. The arm may comprise a magnet and the base may comprise a magnet; the magnet of the arm may be configured to engage the magnet of the base to retain the cover in the closed position; the magnet of the base may be configured to repel the magnet of the cover to prevent the cover from moving toward the closed position. The latch mechanism may comprise a magnetic latch; the magnetic latch may comprise the magnet arrangement within the cover and a magnet arrangement comprising at least one magnet for the base; the magnet arrangement within the cover may comprise at least one magnet; the button may be configured to move from a raised position with the cover in the closed position to a depressed position to release the cover from the base; the magnet arrangement of the base may be configured (a) to prevent movement of the button to the raised position; (b) to prevent the cover from moving to the closed position. The latch mechanism may comprise a magnetic latch; the magnetic latch may comprise the magnet arrangement within the cover and a magnet arrangement for the base; the magnet arrangement within the cover may comprise a magnet comprising at least one magnet segment; the magnet arrangement for the base may comprise a magnet comprising at least one magnet segment; the magnet of the cover may be configured to engage the magnet of the base to hold the cover in the closed position; the magnet of the base may be configured to repel the magnet of the cover to prevent the cover from moving toward the closed position. The magnet for the base may comprise a magnet segment with a first polarity and a magnet segment with a second polarity. The component may comprise at least one of (a) a vehicle trim component, (b) a console, (c) a floor console, (d) a center console, (e) a storage compartment.

The present invention relates to a vehicle interior component configured to be operated by application of an external force from an occupant comprising a base providing a compartment; a cover movable relative to the base from a closed position to an open position; and a latch mechanism. The latch mechanism may comprise an arm providing a latch feature configured to secure the cover to the base. The base may comprise a latch feature. The arm may be configured for movement between (1) a latched position for the latch feature of the arm to engage the latch feature of the base to secure the cover to the base and (2) an unlatched position for the latch feature of the arm to disengage the latch feature of the base to release the cover from the base. The cover may be configured to conceal the latch feature of the arm; the base may be configured to conceal the latch feature of the base. The cover may be configured to conceal the latch feature of the arm when the arm is in the latched position and when the arm is in the unlatched position. The arm may be coupled to the cover. The arm may be configured to slide relative to the cover between the latched position and the unlatched position. The latch feature of the arm may comprise at least one magnet. The latch feature of the base may comprise at least one magnet. The latch feature of the base may be fixed to a sidewall of the base. The latch feature of the base may be provided in a sidewall of the base. The latch feature of the base may comprise a first magnet and a second magnet; the first magnet may be provided in a sidewall of the base and the second magnet may be provided in the sidewall of the base. The first magnet may be configured to hold the arm in the latched position; the second magnet may be configured to hold the arm is the disengaged position. The latch feature of the arm may comprise an element of a material configured to be retained by at least one magnet; the latch feature of the base may comprise at least one magnet. A magnet of the arm may be installed in the arm and a magnet of the base may be installed in the base so that the magnet of the arm engages the magnet of the base when the cover is in the closed position. The arm may be configured to slide between the latched position and the unlatched position. The latch mechanism may comprise a spring configured to move the arm from the unlatched position to the latched position. The latch mechanism may comprise a damper configured to slow movement of the arm from the unlatched position to the latched position. The damper mechanism may comprise a one way rotary damper. The component may further comprise a mechanism configured to actuate movement of the cover from the closed position toward the open position. The mechanism to actuate movement of the cover may comprise a spring. The cover may comprise a door on a hinge. The latch feature of the arm may comprise a magnet and the latch feature of the base may comprise a magnet; the magnet of the arm may engage by magnetic attraction the magnet of the base when the arm is in the latched position and the cover is in the closed position; the magnet of the arm may disengage from magnetic attraction the magnet of the base as the arm is moved to the unlatched position. The base and the cover may comprise at least one of (a) a vehicle trim component, (b) a console, (c) a floor console, (d) a center console, (e) a storage compartment. The cover may comprise a button configured to release the cover from the base. The button may be configured to move in a direction generally orthogonal to a direction of movement of the cover relative to the base. The arm may comprise a first arm and a second arm. The latch mechanism may comprise a linkage configured to substantially link movement of the second arm and the first arm. The first arm and the second arm are configured to move from a retracted position to an extended position to disengage the cover from the base. The latch mechanism may further comprise a spring configured to move the first arm and the second arm from the extended position to the retracted position to secure the cover to the base. The first arm and the second arm may be configured to move from an extended position to a retracted position to disengage the cover from the base. The latch mechanism may further comprise a spring configured to move the first arm and the second arm from the retracted position to the extended position to secure the cover to the base. The first arm may comprise a first magnet and the second arm may comprise a second magnet; the first magnet and the second magnet may be configured to engage magnets in the base to secure the cover to the base. The cover may comprise a button; the first arm may be configured to translate in response to actuation of the button and the second arm may be configured to translate in response to actuation of the button; translation of the first arm and the second arm may release the cover from the base. The latch mechanism may further comprise a rack and pinion mechanism.

The present invention relates to a vehicle interior component configured to be operated by application of an external force from an occupant comprising a base providing a compartment; a cover movable relative to the base from a closed position to an open position; and a latch mechanism. The latch mechanism may be configured to secure the cover to the base. The latch mechanism may comprise a magnetic latch feature for the cover and a magnetic latch feature for the base. The magnetic latch feature for the cover may comprise at least one magnet installed in the cover. The magnetic latch feature for the base may comprise at least one magnet. The cover may be secured to the base by magnetic engagement of the magnetic latch feature for the cover with the magnetic latch feature for the base. The latch mechanism may comprise a magnetic latch mechanism comprising an arm with the magnetic latch feature for the cover that may be configured for an engaged position when the cover is retained to the base and for a disengaged position when the cover is moved toward the open position. The at least one magnet of the magnetic latch feature for the base may be installed in a sidewall of the base and configured so that the at least one magnet for the magnetic latch feature for the base is not in direct contact with the at least one magnet of the magnetic latch feature for the cover when the cover is secured to the base.

The present invention relates to a vehicle interior component configured to be operated by application of an external force from an occupant comprising a base providing an opening for a compartment; a cover movable relative to the base from a closed position to an open position; and a latch mechanism. The latch mechanism may comprise a magnetic latch mechanism comprising an arm providing a magnetic latch feature configured to secure the cover to the base. The base may comprise a magnetic latch feature configured to engage the magnetic latch feature of the arm. The arm may be configured for movement between (1) an engaged position for the magnetic latch feature of the arm to engage the magnetic latch feature of the base to secure the cover to the base and (2) a disengaged position for the magnetic latch feature of the arm to disengage the magnetic latch feature of the base to release the cover from the base. The magnetic latch feature may comprise at least one magnet installed in the cover. The magnetic latch feature may comprise at least one magnet installed in the arm. The magnetic latch feature of the arm may be configured to translate relative to the magnetic latch feature of the base as the arm moves to the disengaged position. The magnetic latch mechanism may provide magnetic attraction between the base and the arm across an interface. The magnetic latch feature of the base may engage the magnetic latch feature of the arm at an interface; the interface may comprise a housing for the at least one magnet of the base and a housing for the at least one magnet of the arm; the latch mechanism may be secured at the interface by contact of the housing for the at least one magnet of the base and the housing for the at least one magnet of the arm. The magnetic latch feature of the arm may engage by magnetic attraction the magnetic latch feature of the base when the arm is engaged and the cover is in the closed position; the magnetic latch feature of the arm may disengage from magnetic attraction with the magnetic latch feature of the base when the arm is in the disengaged position. The magnetic latch feature of the arm and the magnetic latch feature of the base may comprise a complementary configuration to establish magnetic attraction to close the cover to the base; the complementary configuration may comprise a first magnetic element from the magnetic latch feature of the arm providing a first magnetic field configured to engage a second magnetic element from the magnetic latch feature of the base providing a second magnetic field. The first magnetic field may be aligned with the second magnetic field to engage and secure the cover to the base by magnetic attraction. The magnetic latch feature of the arm may be disengaged from the magnetic latch feature of the base by external force to facilitate separation of the cover from the base for the cover to move to the open position.

The present invention relates to a vehicle interior component configured to be operated by application of an external force from an occupant comprising a base providing a compartment; a cover movable relative to the base from a closed position to an open position; and a latch mechanism. The latch mechanism may comprise (1) a magnet coupled to the cover configured to move within the cover between an engaged position to hold the cover in the closed position and a disengaged position to release the cover from the base and (2) a magnet fixed to the base. The cover may be configured to conceal the magnet coupled to the cover; the base may be configured to conceal the magnet fixed to the base. The cover may be configured to conceal the magnet coupled to the cover when the magnet coupled to the cover is in the engaged position and when the magnet coupled to the cover is in the disengaged position. The magnet coupled to the cover may be configured to slide relative to the cover between the engaged position and the disengaged position. The magnet fixed to the base may comprise a set of magnets provided in a sidewall of the base. The set of magnets may comprise a first magnet provided in a sidewall of the base and a second magnet provided in the sidewall of the base. The first magnet may be configured to hold the cover in the closed position, the second magnet may be configured to urge the cover toward the open position. The latch mechanism may comprise a spring configured to move the magnet coupled to the cover from the disengaged position to the engaged position. The latch mechanism may comprise a damper configured to slow movement of the magnet coupled to the cover from the disengaged position to the engaged position. The damper mechanism may comprise a one way rotary damper. The magnet coupled to the cover may be configured to engage by magnetic attraction the magnet fixed to the base when the magnet coupled to the cover is in the engaged position and the cover is in the closed position; the magnet coupled to the cover may disengage from magnetic attraction the magnet fixed to the base as the magnet coupled to the cover is moved to the disengaged position. The magnet coupled to the cover may comprise a left magnet and a right magnet. The left magnet and the right magnet may be configured to move away from one another to release the cover from the base. The left magnet and the right magnet may be configured to move toward one another to release the cover from the base. The latch mechanism may comprise a linkage configured to substantially link movement of the left magnet and the right magnet. The left magnet and the right magnet may be configured to move from an engaged position to a disengaged position to disengage the cover from the base. The latch mechanism may further comprise a spring configured to move the left magnet and the right magnet from the disengaged position to the engaged position to secure the cover to the base. The latch mechanism may further comprise a spring configured to move the left magnet and the right magnet toward one another to secure the cover to the base. The latch mechanism may further comprise a spring configured to move the left magnet and the right magnet away from one another to secure the cover to the base. The cover may comprise a button; the left magnet may be configured to translate in response to actuation of the button and the right magnet may be configured to translate in response to actuation of the button; translation of the left magnet and the right magnet may release the cover from the base. The cover may comprise a button; the button may be configured to move the left magnet away from the right magnet to release the cover from the base. The cover may comprise a button; the button may be configured to (a) move the left magnet away from the button and (b) move the right magnet away from the button to release the cover from the base. The cover may comprise a button; the button may be configured to move the left magnet toward the right magnet to release the cover from the base. The cover may comprise a button; the button may be configured to (a) move the left magnet toward the button and (b) move the right magnet toward the button to release the cover from the base. The latch mechanism may further comprise a rack and pinion mechanism to couple movement of the left magnet and the right magnet.

The present invention relates to a vehicle interior component configured to be operated by application of an external force from an occupant comprising a base providing a compartment; a cover movable relative to the base from a closed position to an open position; and a latch mechanism. The base may comprise a fixed magnet fixed to the base. The cover may comprise a moveable magnet moveable relative to the cover. The latch mechanism may be configured to secure the cover to the base. The latch mechanism may comprise the fixed magnet and the moveable magnet. The moveable magnet may be configured to move from an engaged position to a disengaged position to release the cover from the base. The moveable magnet may be generally aligned with and generally parallel to the fixed magnet when the moveable magnet is in the engaged position; the moveable magnet may be generally misaligned with and generally parallel to the fixed magnet when the moveable magnet is in the disengaged position.

The present invention relates to a vehicle interior component configured to be operated by application of an external force from an occupant comprising a base providing a compartment; a cover movable relative to the base from a closed position to an open position; and a latch mechanism. The latch mechanism may comprise a latch feature configured to secure the cover to the base and a button configured to move the latch feature. The latch feature may be configured to move away from the button to release the cover from the base.

FIGURES

FIG. 3A is a perspective view of a vehicle interior component shown as a console assembly according to an exemplary embodiment.

FIG. 3B is a schematic exploded perspective view of a vehicle interior component shown as a console assembly according to an exemplary embodiment.

FIG. 3C is a schematic partial exploded perspective view of a vehicle interior component shown as a console assembly according to an exemplary embodiment.

FIGS. 4A and 4B are schematic partial section views of a mechanism for a vehicle interior component according to an exemplary embodiment.

FIGS. 4C through 4F are schematic partial section views of operation of a mechanism for a vehicle interior component according to an exemplary embodiment.

FIGS. 4G and 4H are schematic partial section views of a magnet arrangement for a mechanism of a vehicle interior component according to an exemplary embodiment.

FIGS. 6G and 6H are schematic partial section views of a magnet arrangement for a mechanism of a vehicle interior component according to an exemplary embodiment.

FIG. 7A is a perspective view of a vehicle interior component shown as a console assembly according to an exemplary embodiment.

FIG. 7B is a schematic exploded perspective view of a vehicle interior component shown as a console assembly according to an exemplary embodiment.

FIG. 7C is a schematic partial exploded perspective view of a vehicle interior component shown as a console assembly according to an exemplary embodiment.

FIGS. 9A through 9D are schematic partial section views of operation of a mechanism for a vehicle interior component according to an exemplary embodiment.

FIGS. 9E and 9F are schematic partial section views of a magnet arrangement for a mechanism of a vehicle interior component according to an exemplary embodiment.

FIGS. 11A and 11B are schematic partial section views of a mechanism for a vehicle interior component according to an exemplary embodiment.

FIGS. 11C through 11F are schematic partial section views of operation of a mechanism for a vehicle interior component according to an exemplary embodiment.

FIGS. 11G and 11H are schematic partial section views of a magnet arrangement for a mechanism of a vehicle interior component according to an exemplary embodiment.

DESCRIPTION

Figure 1A:
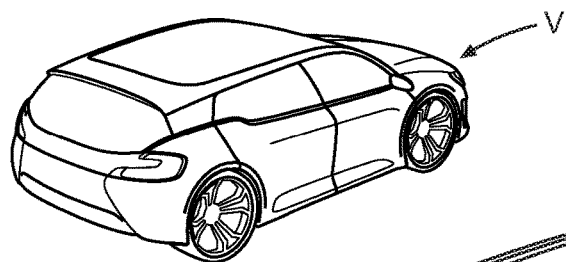
FIG. 1A is a schematic perspective view of a vehicle according to an exemplary embodiment.
Figure 1B:
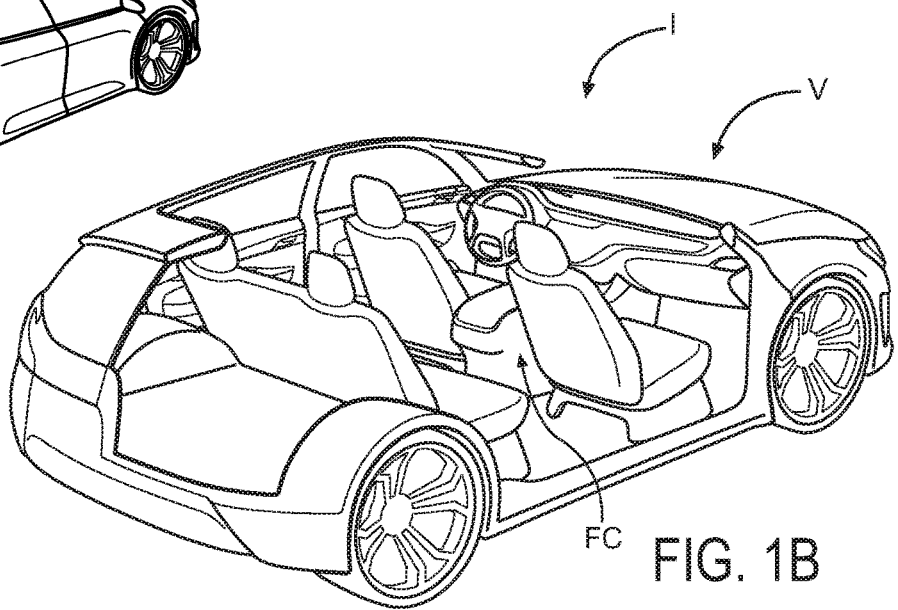
FIG. 1B is a schematic perspective view of a vehicle showing a vehicle interior according to an exemplary embodiment.

Referring to FIGS. 1A and 1B, a vehicle V is shown schematically including an interior I with a component shown as a floor console FC. According to an exemplary embodiment, a component shown as floor console FC may comprise a cover/door configured to move between a closed position and an open position; floor console FC may provide a storage compartment within floor console FC; the cover/door may facilitate access of the storage compartment.

Figure 2A:
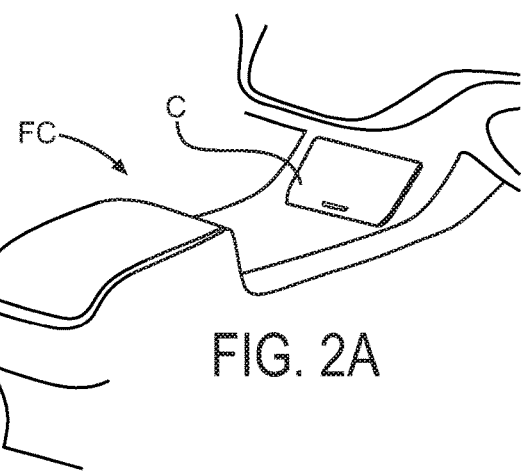
FIGS. 2A through 2C are schematic perspective views of a vehicle interior component shown as a console assembly according to an exemplary embodiment.
Figure 2B:
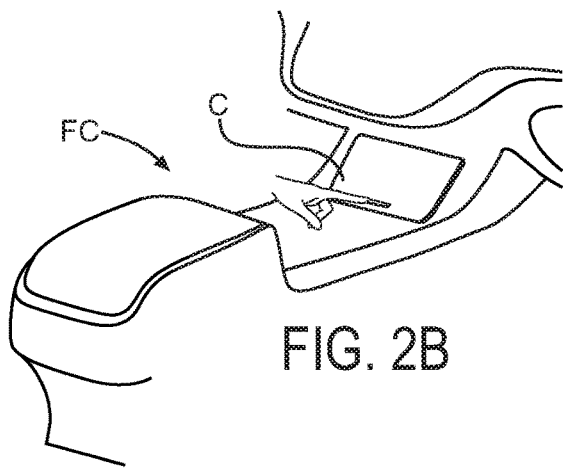
Figure 2C:
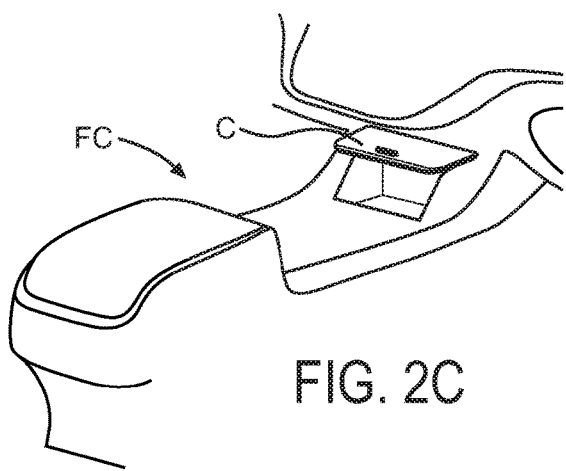

Referring to FIGS. 2A through 2C, a component shown as floor console/assembly FC is shown schematically in a vehicle interior according to an exemplary embodiment; as indicated, the floor console assembly FC provides a cover/door shown as cover C which may be opened and closed (e.g. to provide and/or restrict access to a storage compartment/volume within the base of the component).

According to an exemplary embodiment as shown schematically in FIGS. 2A-2C, 3A-3C and 4A-4H, a vehicle interior component FC/1000 configured to be operated by application of an external force from an occupant may comprise a base B/1100 providing a compartment (with sidewalls 1125 providing a bracket/mount 1120 for latch components); a cover C/1200 movable relative to base B/1100 from a closed position (see FIGS. 2A and 3A) to an open position (see FIG. 2C); and a latch mechanism LM/1300.

As indicated schematically according to an exemplary embodiment, the latch mechanism for the component may comprise a magnetic latch comprising a latch components shown as a set of magnet arrangements M (e.g. magnet/magnet segment arrangement that may comprise magnet MB, magnet MC, magnet MB1, magnet MB2, magnet segments with N/north polarity and S/south polarity, etc.). See e.g. FIGS. 3C, 4C-4H, 5C, 6C-6H, 7C, 8C-8F, 9A-9F, 10C and 11C-11H.

According to an exemplary embodiment, vehicle interior component FC/1000 may comprise a mechanism/spring 1400 configured to actuate movement of cover C/1200 from the closed position toward the open position. Latch mechanism 1300 may comprise at least one of a button BT/1310; a spring SP; an arm 1320; a damper D; magnet arrangement M with a magnet MC; magnet arrangement M with a magnet MB (e.g. as latch components on bracket/mount 1120). Latch mechanism 1300 may be configured to secure cover C/1200 to base 1100 (e.g. by interaction of latch components shown as magnet arrangements M). See FIGS. 4A, 4C and 4G. Latch mechanism 1300 may be configured to release cover C/1200 from base 1100 (e.g. by interaction of latch components shown as magnet arrangements M). See FIGS. 4B, 4D-4F and 4H.

Figure 5A:
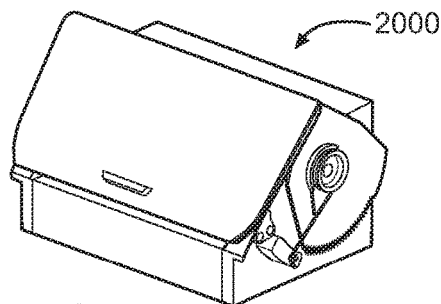
FIG. 5A is a perspective view of a vehicle interior component shown as a console assembly according to an exemplary embodiment.
Figure 5B:
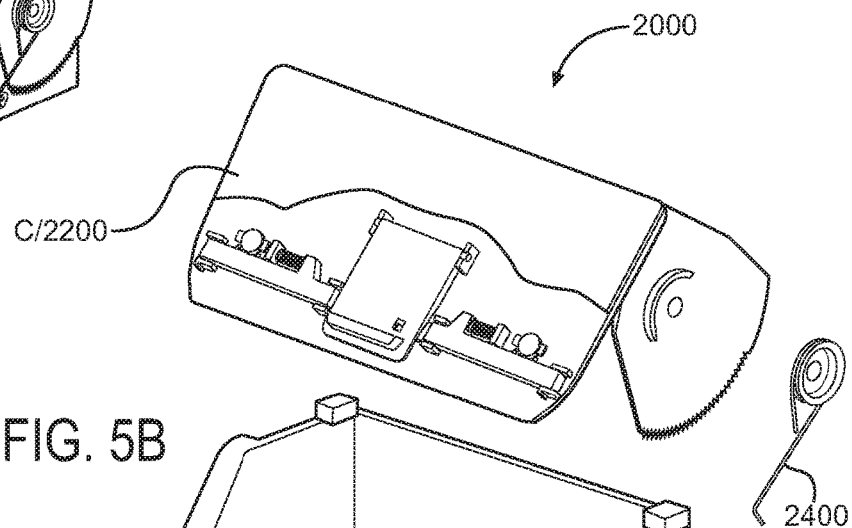
FIG. 5B is a schematic exploded perspective view of a vehicle interior component shown as a console assembly according to an exemplary embodiment.
Figure 5C:
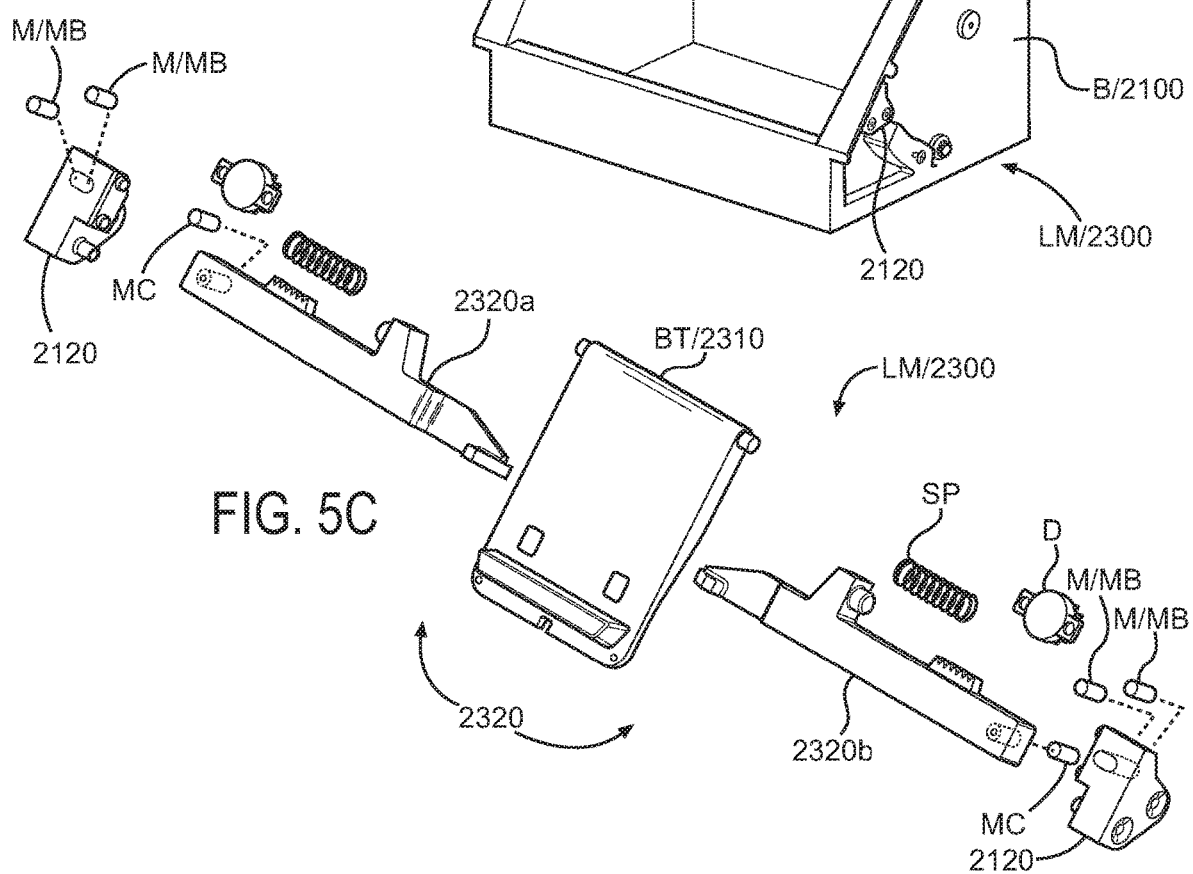
FIG. 5C is a schematic partial exploded perspective view of a vehicle interior component shown as a console assembly according to an exemplary embodiment.
Figure 6A:
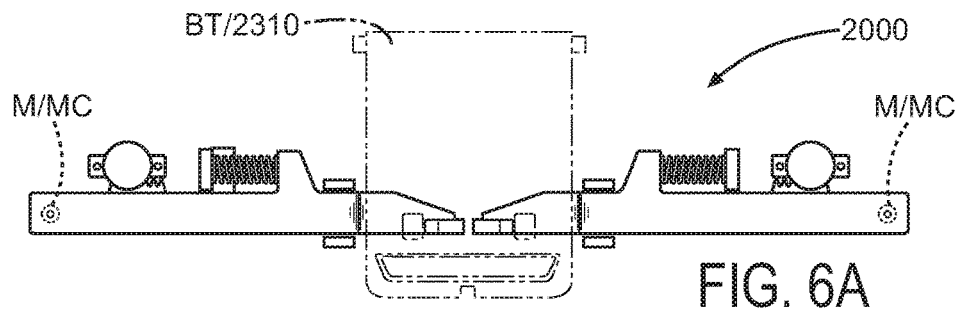
FIGS. 6A and 6B are schematic partial section views of a mechanism for a vehicle interior component according to an exemplary embodiment.
Figure 6B:
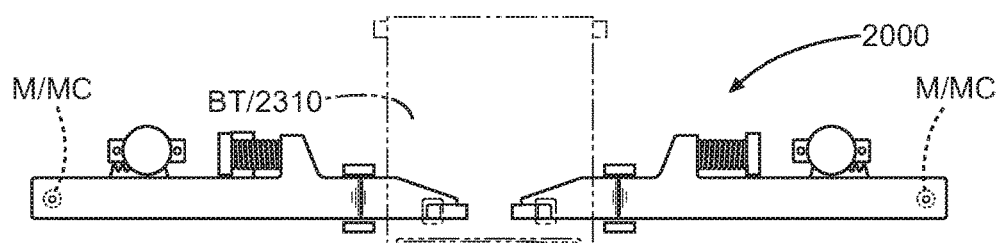
Figure 6C:
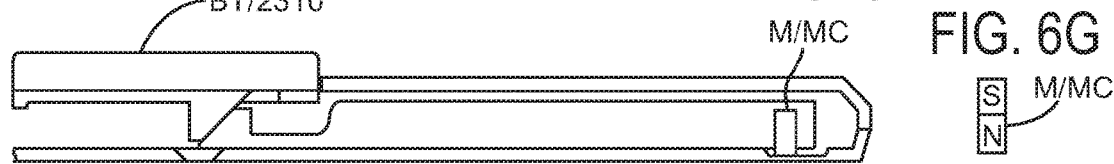
FIGS. 6C through 6F are schematic partial section views of operation of a mechanism for a vehicle interior component according to an exemplary embodiment.
Figure 6D:
Figure 6E:
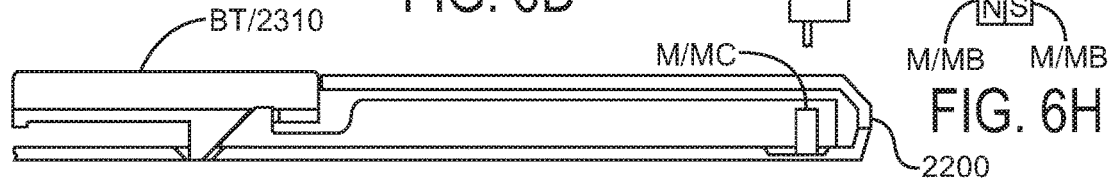
Figure 6F:
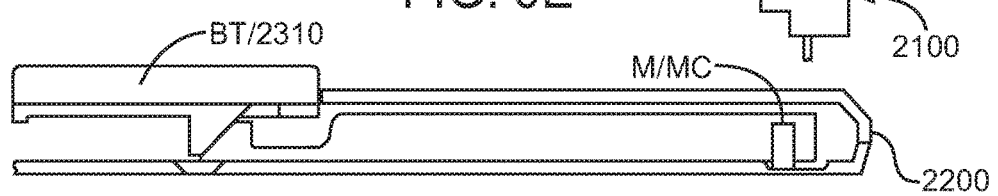
Figure 8A:
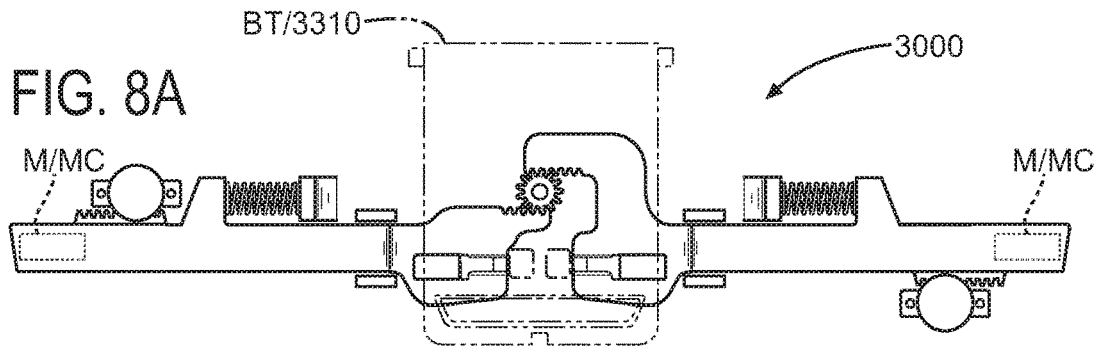
FIGS. 8A and 8B are schematic partial section views of a mechanism for a vehicle interior component according to an exemplary embodiment.
Figure 8B:
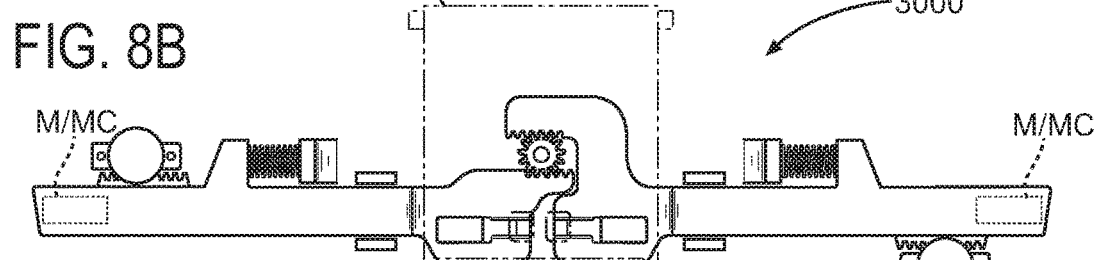
Figure 8C:
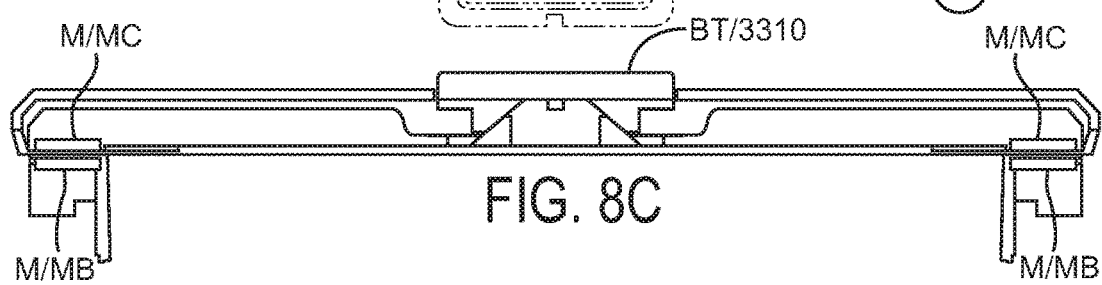
FIGS. 8C through 8F are schematic partial section views of operation of a mechanism for a vehicle interior component according to an exemplary embodiment.
Figure 8D:
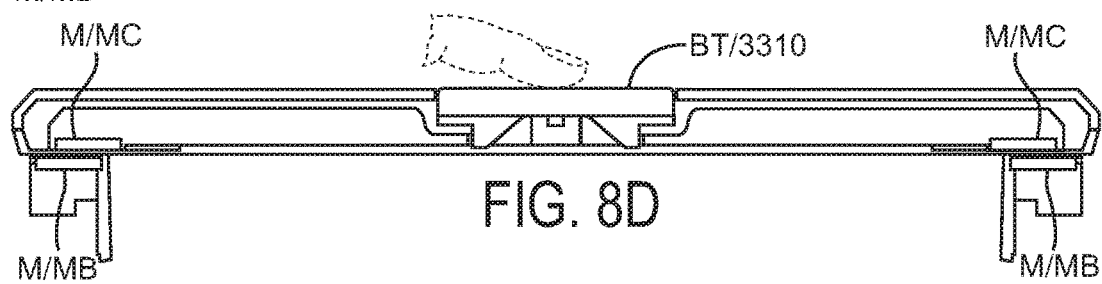
Figure 8E:
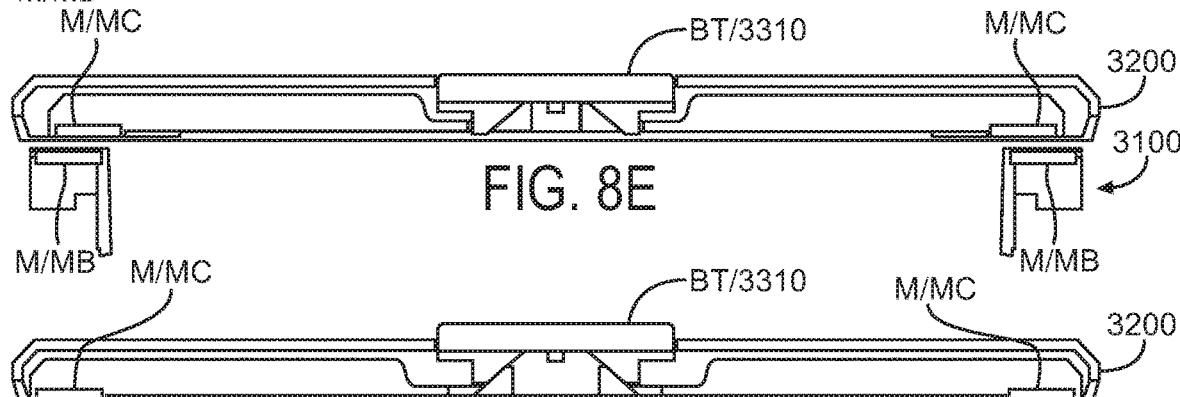
Figure 8F:
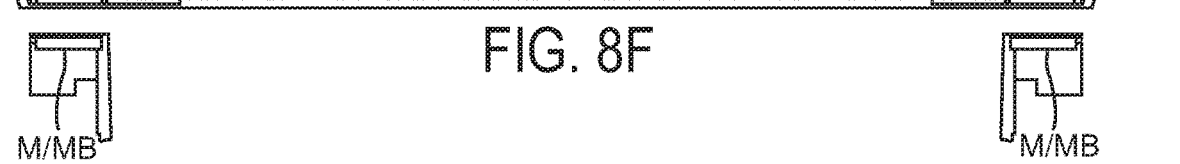
Figure 10A:
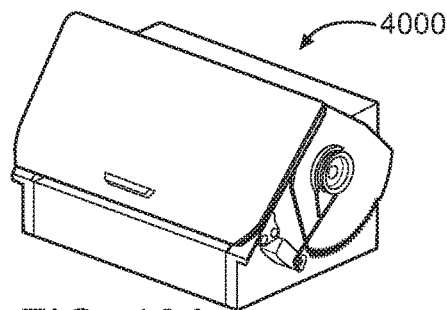
FIG. 10A is a perspective view of a vehicle interior component shown as a console assembly according to an exemplary embodiment.
Figure 10B:
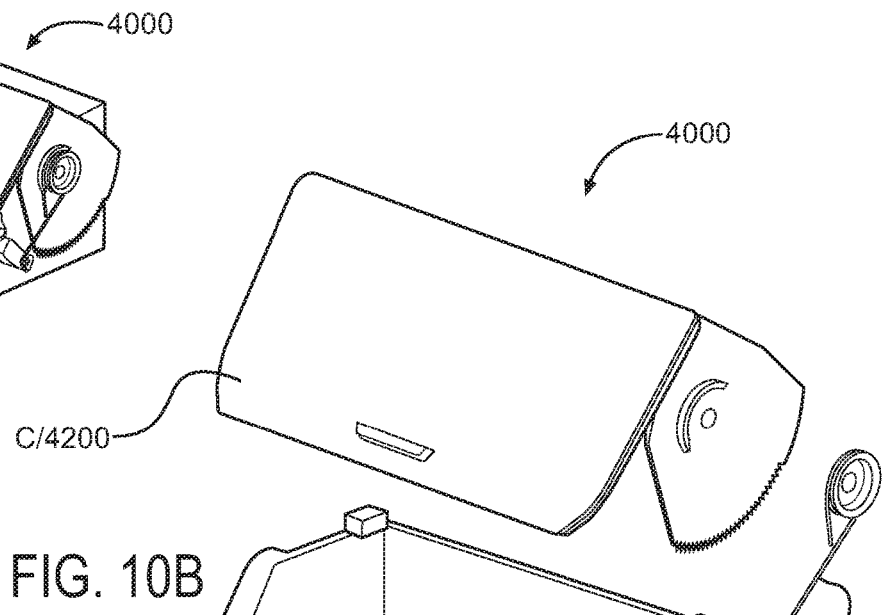
FIG. 10B is a schematic exploded perspective view of a vehicle interior component shown as a console assembly according to an exemplary embodiment.
Figure 10C:
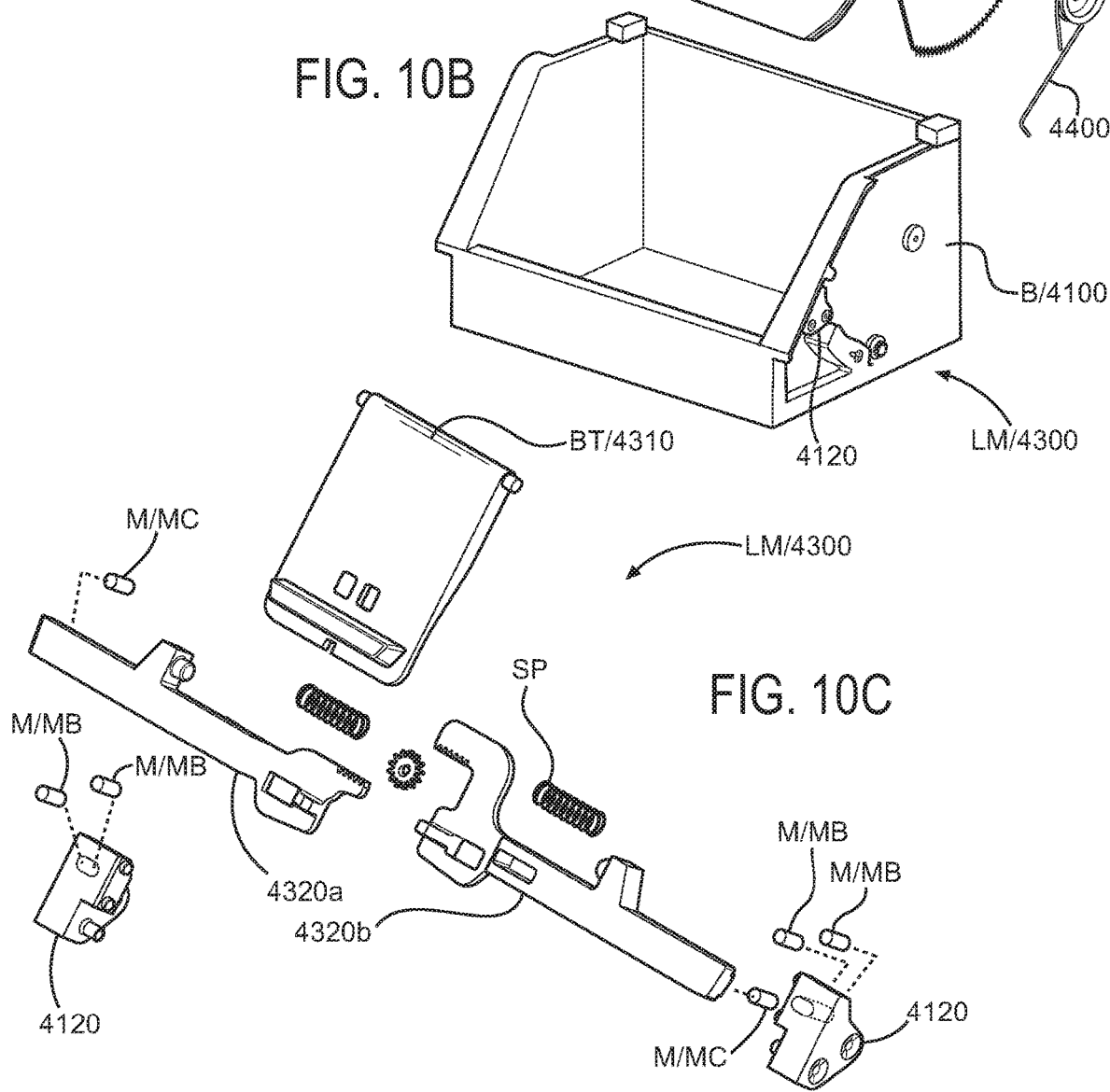
FIG. 10C is a schematic partial exploded perspective view of a vehicle interior component shown as a console assembly according to an exemplary embodiment.

According to an exemplary embodiment as shown schematically in FIGS. 2A-2C, 5A-5C and 6A-6H, a vehicle interior component FC/2000 configured to be operated by application of an external force from an occupant may comprise a base B/2100 providing a compartment; a cover C/2200 movable relative to base B/2100 from a closed position (see FIGS. 2A and 5A) to an open position (see FIG. 2C); and a latch mechanism LM/2300. Vehicle interior component FC/2000 may comprise a mechanism/spring 2400 configured to actuate movement of cover C/2200 from the closed position toward the open position. Latch mechanism LM/2300 may comprise at least one of a button BT/2310; a spring/set of springs SP; an arm/set of arms; a damper/set of dampers D; magnet arrangement M with a magnet/set of magnets MC; magnet arrangement M with a magnet/set of magnets MB1/MB2 (e.g. as latch components on bracket/mount 2120). The set of arms may comprise a left arm 2320a and a right arm 2320b. Latch mechanism 2300 may be configured to secure cover C/2200 to base 2100 (e.g. by interaction of latch components shown as magnet arrangements M). See FIGS. 6A, 6C and 6G. Latch mechanism 2300 may be configured to release cover C/2200 from base 2100 (e.g. by interaction of latch components shown as magnet arrangements M). See FIGS. 6B, 6D-6F and 6H.

According to an exemplary embodiment as shown schematically in FIGS. 2A-2C, 7A-7C, 8A-8F and 9A-9F, a vehicle interior component FC/3000 configured to be operated by application of an external force from an occupant may comprise a base B/3100 providing a compartment; a cover C/3200 movable relative to base B/3100 from a closed position (see FIGS. 2A and 7A) to an open position (see FIG. 2C); and a latch mechanism LM/3300. Vehicle interior component FC/3000 may comprise a mechanism/spring 3400 configured to actuate movement of cover C/3200 from the closed position toward the open position. Latch mechanism LM/3300 may comprise at least one of a button BT/3310; a spring/set of springs SP; an arm/set of arms; a damper/set of dampers D; magnet arrangement M with a magnet/set of magnets MC; magnet arrangement M with a magnet/set of magnets MB (e.g. as latch components on bracket/mount 3120). The set of arms may comprise a left arm 3320a and a right arm 3320b. Latch mechanism 3300 may be configured to secure cover C/3200 to base 3100 (e.g. by interaction of latch components shown as magnet arrangements M). See FIGS. 8A, 8C, 9A and 9E. Latch mechanism 3300 may be configured to release cover C/3200 from base 3100 (e.g. by interaction of latch components shown as magnet arrangements M). See FIGS. 8B, 8D-8F, 9B-9D and 9F.

According to an exemplary embodiment as shown schematically in FIGS. 2A-2C, 10A-10C and 11A-11H, a vehicle interior component FC/4000 configured to be operated by application of an external force from an occupant may comprise a base B/4100 providing a compartment; a cover C/4200 movable relative to base B/4100 from a closed position (see FIGS. 2A and 11A) to an open position (see FIG. 2C); and a latch mechanism LM/4300. Vehicle interior component FC/4000 may comprise a mechanism/spring 4400 configured to actuate movement of cover C/4200 from the closed position toward the open position. Latch mechanism LM/4300 may comprise at least one of a button BT/4310; a spring/set of springs SP; an arm/set of arms 4320; magnet arrangement M with a magnet/set of magnets MC; magnet arrangement M with a magnet/set of magnets MB1/MB2 (e.g. as latch components on bracket/mount 4120). Set of arms may comprise a left arm 4320a and a right arm 4320b. Latch mechanism 4300 may be configured to secure cover C/4200 to base 4100 (e.g. by interaction of latch components shown as magnet arrangements M). See FIGS. 11A, 11C, and 11G. Latch mechanism 4300 may be configured to release cover C/4200 from base 4100 (e.g. by interaction of latch components shown as magnet arrangements M). See FIGS. 11B, 11D-11F and 11H.

According to an exemplary embodiment as shown schematically, a vehicle interior component may comprise: a base B; a cover C movable relative to the base from a closed position to an open position; and a latch mechanism LM. See e.g. FIGS. 2A-2C. The latch mechanism LM may comprise a magnet arrangement M configured for movement within the cover for an engaged state and a disengaged state to release the cover from the closed position. See e.g. FIGS. 3A-3C, 4C-4H, 5A-5C, 6C-6H, 7A-7C, 8C-8F, 9A-9F, 10A-10C and 11C-11H. The magnet arrangement M may be configured to maintain the disengaged state after the cover has been released from the base. See e.g. FIGS. 4D, 6D, 8D, 9B and 11D. As indicated schematically in FIGS. 3A-3C, 5A-C, 7A-7C and 10A-10C, the latch mechanism LM may comprise a magnet arrangement of the base comprising at least one magnet on the base. As indicated schematically in FIGS. 3A-3C, 5A-C, 7A-7C and 10A-10C, the magnet arrangement M of the base B may comprise a first magnet and a second magnet; the first magnet may be configured to retain at least one magnet of the cover in the engaged state, the second magnet may be configured to retain at least one magnet of the cover in the disengaged state. See also FIGS. 4D, 6D, 8D, 9B and 11D. The magnet arrangement M of the cover may be configured to be concealed within the cover; the magnet arrangement M of the base B may be configured to be concealed within the base B. See e.g. FIGS. 2A-2C, 5A, 7A and 10A. As indicated schematically in FIGS. 3A-3C, 5A-5C, 7A-7C and 10A-10C, the base B may comprise a first sidewall and a second sidewall; the magnet arrangement M of the base B may comprise a first magnet on the first sidewall of the base B and a second magnet on the second sidewall of the base B; the magnet arrangement M of the cover C may comprise a first magnet and a second magnet; the first magnet of the cover C may be configured to engage the first magnet of the base B and the second magnet of the cover C may be configured to engage the second magnet of the base B. See also FIGS. 4C-4H, 6C-6H, 8C-8F, 9A-9F and 11C-11H. The cover C may comprise a button BT for the latch mechanism LM configured to release the cover C from the base B; the magnet arrangement M of the cover C may be configured to move away from the button BT to release the cover C from the base B. See e.g. FIGS. 4D, 6D, 8D, 9B and 11D. The latch mechanism LM may comprise a damper D for the magnet arrangement M of the cover C; the damper D may be configured to slow movement of the magnet arrangement M of the cover C from the disengaged state to the engaged state. See e.g. FIGS. 3C, 5C, 7C and 10C.

As indicated schematically in FIGS. 3A-3C, 5A-C, 7A-7C and 10A-10C, a vehicle interior component may comprise: a base B; a cover C movable relative to the base B from a closed position to an open position; and a latch mechanism LM; the latch mechanism LM may comprise a magnet arrangement M configured for movement within the cover C for an engaged state and a disengaged state to release the cover C from the closed position. See also FIGS. 2A-2C, 4C-4H, 6C-6H, 8C-8F, 9A-9F and 11C-11H. As indicated schematically in FIGS. 3C, 5C, 7C and 10C, the magnet arrangement M within the cover C may comprise a first magnet and a second magnet; the first magnet may be configured for movement relative to the second magnet to release the cover C from the base B. The first magnet and the second magnet may be configured to move apart to release the cover C from the base B. See e.g. FIGS. 4D, 6D, 8D, 9B and 11D. The first magnet may be configured to move toward the second magnet to release the cover C from the base B. See e.g. FIGS. 3C, 4C-4H, 5C, 6C-6H, 7C, 8C-8F, 9A-9F, 10C and 11C-11H. As indicated schematically in FIGS. 3C, 5C, 7C and 10C, the latch mechanism LM may comprise a linkage; the linkage may be configured to link movement the first magnet and the second magnet; the linkage may comprise a rack and pinion mechanism. See e.g. FIGS. 3C, 4C-4H, 5C, 6C-6H, 7C, 8C-8F, 9A-9F, 10C and 11C-11H. The latch mechanism LM may comprise a spring; the spring may be configured to facilitate relative movement of the first magnet and the second magnet. See e.g. FIGS. 3C, 4A-4H, 5C, 6A-6H, 7C, 8A-8F, 9A-9F, 10C and 11A-11H. The cover C may comprise a button BT for the latch mechanism LM configured to release the cover C from the base B; actuation of the button BT for the latch mechanism LM may be configured to translate the first magnet; actuation of the button BT for the latch mechanism LM may be configured to translate the second magnet. See e.g. FIGS. 4A-4H, 6A-6H, 8A-8F, 9A, 9B and 11A-11D.

According to an exemplary embodiment as shown schematically, a vehicle interior component may comprise: a base B; a cover C movable relative to the base B from a closed position to an open position; and a latch mechanism LM; the latch mechanism LM may comprise a magnet arrangement M configured for movement within the cover C for an engaged state and a disengaged state to release the cover C from the closed position. See e.g. FIGS. 2A-2C. 3C, 4C-4H, 5C, 6C-6H, 7C, 8C-8F, 9A-9F, 10C and 11C-11H. The cover C may comprise a button BT; the cover C may comprise an arm configured to be actuated by the button BT; the arm may be configured to retain the cover C to the base B until actuated to movement by the button BT; the arm may be configured for movement from the button BT to release the cover C from the base B. See e.g. FIGS. 4D, 6D, 8D, 9B and 11D.

As indicated schematically in FIGS. 3A-3C, 5A-C, 7A-7C and 10A-10C, the latch mechanism LM may comprise a magnetic latch; the magnetic latch may comprise the magnet arrangement M; the magnet arrangement M may comprise at least one magnet for the arm; the button BT may be configured to actuate the magnetic latch; actuation of the magnetic latch by the button BT may be configured to move at least one magnet of the arm relative to the base B to actuate movement of the cover C from the closed position to the open position. See also FIGS. 4A-4F, 6A-6F, 8A-8F, 9A-9D and 11A-11F. As indicated schematically in FIGS. 3C, 5C, 7C and 10C, the arm may comprise a magnet and the base B may comprise a magnet; the magnet of the arm may be configured to engage the magnet of the base B to retain the cover C in the closed position; the magnet of the base B may be configured to repel the magnet of the cover C to prevent the cover C from moving toward the closed position. See e.g. FIGS. 4D, 6D, 8D, 9B and 11D.

As indicated schematically in FIGS. 3C, 4C-4H, 5C, 6C-6H, 7C, 8C-8F, 9A-9F, 10C and 11C-11H, the latch mechanism LM may comprise a magnetic latch; the magnetic latch may comprise the magnet arrangement M within the cover C and a magnet arrangement M comprising at least one magnet for the base B; the magnet arrangement M within the cover C may comprise at least one magnet; the button BT may be configured to move from a raised position with the cover C in the closed position to a depressed position to release the cover C from the base B; the magnet arrangement M of the base B may be configured (a) to prevent movement of the button BT to the raised position; (b) to prevent the cover C from moving to the closed position. See also FIGS. 4A-4F, 6A-6F, 8A-8F, 9A-9D and 11A-11F.

As indicated schematically in FIGS. 3C, 4A-4H, 5C, 6A-6H, 7C, 8A-8F, 9A-9F, 10C and 11A-11H, the latch mechanism LM may comprise a magnetic latch; the magnetic latch may comprise the magnet arrangement M within the cover C and a magnet arrangement M for the base B (e.g. corresponding magnets/magnet segments of the respective magnet arrangements in a N/north-S/south polarity configuration for magnetic attraction to provide a magnetic latch effect for engagement/closure). As indicated schematically in FIGS. 3A, 4C-4F, 5A, 6C-6F, 7A, 8C-8F, 9A-9D, 10A and 11C-11F, the magnet arrangement M within the cover C may comprise a magnet comprising at least one magnet segment; the magnet arrangement M for the base B may comprise a magnet comprising at least one magnet segment. As indicated schematically in FIGS. 4G-4H, 6G-6H, 9E-9F, and 11G-11H, the magnet arrangement M for the base B may comprise a magnet segment with a first polarity (e.g. N/north) and a magnet segment with a second polarity (e.g. S/south).

As indicated schematically in FIGS. 3A, 4C-4F, 5A, 6C-6F, 7A, 8C-8F, 9A-9D, 10A and 11C-11F, the magnet/ magnet arrangement M of the magnet of the cover C may be configured to engage the magnet arrangement M of the base B to hold the cover C in the closed position (e.g. by alignment of N/north-S/south polarity for magnetic attraction, see FIGS. 4C and 4G, 6C and 6G, 8C, 9A and 9E and 11C and 11G); the magnet/magnet arrangement M of the base B may be configured to disengage the magnet/magnet arrangement M of the cover C to prevent the cover C from moving toward the closed position (e.g. by separation to release magnetic attraction, see FIGS. 4D and 4H, 6D and 6H, 8D, 9B and 9F and 11D and 11H); the magnet/magnet arrangement M of the base B may be configured to repel the magnet/magnet arrangement M of the cover C to prevent the cover C from moving toward the closed position (e.g. by alignment of N/north-N/north and/or S/south-S/south polarity for magnetic repulsion see FIGS. 6D-6E and 6H, 8D-8E, 9B-9C and 9F and 11D-11E and 11H). As indicated schematically in FIGS. 4C and 4F, 6C and 6F, 8C and 8F, 9A and 9D and 11C and 11F, the magnet/magnet arrangement M of the cover C may be configured to provide a default/unactuated position when the button BT is unactuated (e.g. magnet/magnet arrangements positioned for engagement/magnetic latching for closure upon movement of the cover to the base). See also FIGS. 4G, 6G, 9E and 11G.

The component may comprise at least one of (a) a vehicle trim component, (b) a console, (c) a floor console, (d) a center console, (e) a storage compartment. See generally FIGS. 1A-1B and 2A-2C.

Exemplary Embodiments

According to an exemplary embodiment as shown schematically in FIGS. 2A-2C, 3A-3C, 4A-4H, 5A-5C, 6A-6H, 7A-7C, 8A-8F, 9A-9F, 10A-10C and 11A-11H, a vehicle interior component configured to be operated by application of an external force from an occupant may comprise a base providing a compartment; a cover movable relative to the base from a closed position to an open position; and a latch mechanism. The latch mechanism may comprise an arm providing a latch feature configured to secure the cover to the base. The base may comprise a latch feature. The arm may be configured for movement between (1) a latched position for the latch feature of the arm to engage the latch feature of the base to secure the cover to the base and (2) an unlatched position for the latch feature of the arm to disengage the latch feature of the base to release the cover from the base. The cover may be configured to conceal the latch feature of the arm; the base may be configured to conceal the latch feature of the base. The cover may be configured to conceal the latch feature of the arm when the arm is in the latched position and when the arm is in the unlatched position. The arm may be coupled to the cover. The arm may be configured to slide relative to the cover between the latched position and the unlatched position. The latch feature of the arm may comprise at least one magnet. The latch feature of the base may comprise at least one magnet. The latch feature of the base may be fixed to a sidewall of the base. The latch feature of the base may be provided in a sidewall of the base. The latch feature of the arm may comprise an element of a material configured to be retained by at least one magnet; the latch feature of the base may comprise at least one magnet. A magnet of the arm may be installed in the arm and a magnet of the base may be installed in the base so that the magnet of the arm engages the magnet of the base when the cover is in the closed position. The arm may be configured to slide between the latched position and the unlatched position. The latch mechanism may comprise a spring configured to move the arm from the unlatched position to the latched position. The latch mechanism may comprise a damper configured to slow movement of the arm from the unlatched position to the latched position. The damper mechanism may comprise a one way rotary damper. The component may further comprise a mechanism configured to actuate movement of the cover from the closed position toward the open position. The mechanism to actuate movement of the cover may comprise a spring. The cover may comprise a door on a hinge. The latch feature of the arm may comprise a magnet and the latch feature of the base may comprise a magnet; the magnet of the arm may engage by magnetic attraction the magnet of the base when the arm is in the latched position and the cover is in the closed position; the magnet of the arm may disengage from magnetic attraction the magnet of the base as the arm is moved to the unlatched position. The base and the cover may comprise at least one of (a) a vehicle trim component, (b) a console, (c) a floor console, (d) a center console, (e) a storage compartment. The cover may comprise a button configured to release the cover from the base. The button may be configured to move in a direction generally orthogonal to a direction of movement of the cover relative to the base. According to an exemplary embodiment as shown schematically in FIGS. 2A-2C, 5A-5C, 6A-6H, 10A-10C and 11A-11H the latch feature of the base may comprise a first magnet and a second magnet; the first magnet may be provided in a sidewall of the base and the second magnet may be provided in the sidewall of the base. The first magnet may be configured to hold the arm in the latched position; the second magnet may be configured to hold the arm is the disengaged position. According to an exemplary embodiment as shown schematically in FIGS. 2A-2C, 5A-5C, 6A-6H, 7A-7C, 8A-8F, 9A-9F, 10A-10C and 11A-11H, the arm may comprise a first arm and a second arm. The latch mechanism may comprise a linkage configured to substantially link movement of the second arm and the first arm. The first arm and the second arm are configured to move from a retracted position to an extended position to disengage the cover from the base. The latch mechanism may further comprise a spring configured to move the first arm and the second arm from the extended position to the retracted position to secure the cover to the base. The first arm and the second arm may be configured to move from an extended position to a retracted position to disengage the cover from the base. The latch mechanism may further comprise a spring configured to move the first arm and the second arm from the retracted position to the extended position to secure the cover to the base. The first arm may comprise a first magnet and the second arm may comprise a second magnet; the first magnet and the second magnet may be configured to engage magnets in the base to secure the cover to the base. The cover may comprise a button; the first arm may be configured to translate in response to actuation of the button and the second arm may be configured to translate in response to actuation of the button; translation of the first arm and the second arm may release the cover from the base. The latch mechanism may further comprise a rack and pinion mechanism.

According to an exemplary embodiment as shown schematically in FIGS. 2A-2C, 3A-3C, 4A-4H, 5A-5C, 6A-6H, 7A-7C, 8A-8F, 9A-9F, 10A-10C and 11A-11H, a vehicle interior component configured to be operated by application of an external force from an occupant may comprise a base providing a compartment; a cover movable relative to the base from a closed position to an open position; and a latch mechanism. The latch mechanism may be configured to secure the cover to the base. The latch mechanism may comprise a magnetic latch feature for the cover and a magnetic latch feature for the base. The magnetic latch feature for the cover may comprise at least one magnet installed in the cover. The magnetic latch feature for the base may comprise at least one magnet. The cover may be secured to the base by magnetic engagement of the magnetic latch feature for the cover with the magnetic latch feature for the base. The latch mechanism may comprise a magnetic latch mechanism comprising an arm with the magnetic latch feature for the cover that may be configured for an engaged position when the cover is retained to the base and for a disengaged position when the cover is moved toward the open position. The at least one magnet of the magnetic latch feature for the base may be installed in a sidewall of the base and configured so that the at least one magnet for the magnetic latch feature for the base is not in direct contact with the at least one magnet of the magnetic latch feature for the cover when the cover is secured to the base.

According to an exemplary embodiment as shown schematically in FIGS. 2A-2C, 3A-3C, 4A-4H, 5A-5C, 6A-6H, 7A-7C, 8A-8F, 9A-9F, 10A-10C and 11A-11H, a vehicle interior component configured to be operated by application of an external force from an occupant may comprise a base providing an opening for a compartment; a cover movable relative to the base from a closed position to an open position; and a latch mechanism. The latch mechanism may comprise a magnetic latch mechanism comprising an arm providing a magnetic latch feature configured to secure the cover to the base. The base may comprise a magnetic latch feature configured to engage the magnetic latch feature of the arm. The arm may be configured for movement between (1) an engaged position for the magnetic latch feature of the arm to engage the magnetic latch feature of the base to secure the cover to the base and (2) a disengaged position for the magnetic latch feature of the arm to disengage the magnetic latch feature of the base to release the cover from the base. The magnetic latch feature may comprise at least one magnet installed in the cover. The magnetic latch feature may comprise at least one magnet installed in the arm. The magnetic latch feature of the arm may be configured to translate relative to the magnetic latch feature of the base as the arm moves to the disengaged position. The magnetic latch mechanism may provide magnetic attraction between the base and the arm across an interface. The magnetic latch feature of the base may engage the magnetic latch feature of the arm at an interface; the interface may comprise a housing for the at least one magnet of the base and a housing for the at least one magnet of the arm; the latch mechanism may be secured at the interface by contact of the housing for the at least one magnet of the base and the housing for the at least one magnet of the arm. The magnetic latch feature of the arm may engage by magnetic attraction the magnetic latch feature of the base when the arm is engaged and the cover is in the closed position; the magnetic latch feature of the arm may disengage from magnetic attraction with the magnetic latch feature of the base when the arm is in the disengaged position. The magnetic latch feature of the arm and the magnetic latch feature of the base may comprise a complementary configuration to establish magnetic attraction to close the cover to the base; the complementary configuration may comprise a first magnetic element from the magnetic latch feature of the arm providing a first magnetic field configured to engage a second magnetic element from the magnetic latch feature of the base providing a second magnetic field. The first magnetic field may be aligned with the second magnetic field to engage and secure the cover to the base by magnetic attraction. The magnetic latch feature of the arm may be disengaged from the magnetic latch feature of the base by external force to facilitate separation of the cover from the base for the cover to move to the open position.

According to an exemplary embodiment as shown schematically in FIGS. 2A-2C, 3A-3C, 4A-4H, 5A-5C, 6A-6H, 7A-7C, 8A-8F, 9A-9F, 10A-10C and 11A-11H, a vehicle interior component configured to be operated by application of an external force from an occupant may comprise a base providing a compartment; a cover movable relative to the base from a closed position to an open position; and a latch mechanism. The latch mechanism may comprise (1) a magnet coupled to the cover configured to move within the cover between an engaged position to hold the cover in the closed position and a disengaged position to release the cover from the base and (2) a magnet fixed to the base. The cover may be configured to conceal the magnet coupled to the cover; the base may be configured to conceal the magnet fixed to the base. The cover may be configured to conceal the magnet coupled to the cover when the magnet coupled to the cover is in the engaged position and when the magnet coupled to the cover is in the disengaged position. The magnet coupled to the cover may be configured to slide relative to the cover between the engaged position and the disengaged position. The magnet fixed to the base may comprise a set of magnets provided in a sidewall of the base. The set of magnets may comprise a first magnet provided in a sidewall of the base and a second magnet provided in the sidewall of the base. The latch mechanism may comprise a spring configured to move the magnet coupled to the cover from the disengaged position to the engaged position. The latch mechanism may comprise a damper configured to slow movement of the magnet coupled to the cover from the disengaged position to the engaged position. The damper mechanism may comprise a one way rotary damper. The magnet coupled to the cover may be configured to engage by magnetic attraction the magnet fixed to the base when the magnet coupled to the cover is in the engaged position and the cover is in the closed position; the magnet coupled to the cover may disengage from magnetic attraction the magnet fixed to the base as the magnet coupled to the cover is moved to the disengaged position. According to an exemplary embodiment as shown schematically in FIGS. 2A-2C, 5A-5C, 6A-6F, 11A-11C and 12A-12F, the first magnet may be configured to hold the cover in the closed position, the second magnet may be configured to urge the cover toward the open position. According to an exemplary embodiment as shown schematically in FIGS. 2A-2C, 5A-5C, 6A-6H, 7A-7C, 8A-8F, 9A-9F, 10A-10C and 11A-11H, the magnet coupled to the cover may comprise a left magnet and a right magnet. The latch mechanism may comprise a linkage configured to substantially link movement of the left magnet and the right magnet. The left magnet and the right magnet may be configured to move from an engaged position to a disengaged position to disengage the cover from the base. The latch mechanism may further comprise a spring configured to move the left magnet and the right magnet from the disengaged position to the engaged position to secure the cover to the base. The cover may comprise a button; the left magnet may be configured to translate in response to actuation of the button and the right magnet may be configured to translate in response to actuation of the button; translation of the left magnet and the right magnet may release the cover from the base. The latch mechanism may further comprise a rack and pinion mechanism to couple movement of the left magnet and the right magnet. According to an exemplary embodiment as shown schematically in FIGS. 2A-2C, 5A-5C and 6A-6H, the left magnet and the right magnet may be configured to move away from one another to release the cover from the base. The latch mechanism may further comprise a spring configured to move the left magnet and the right magnet toward one another to secure the cover to the base. The cover may comprise a button; the button may be configured to move the left magnet away from the right magnet to release the cover from the base. The cover may comprise a button; the button may be configured to (a) move the left magnet away from the button and (b) move the right magnet away from the button to release the cover from the base. According to an exemplary embodiment as shown schematically in FIGS. 2A-2C, 7A-7C, 8A-8F, 9A-9F, 10A-10C and 11A-11H, the left magnet and the right magnet may be configured to move toward one another to release the cover from the base. The latch mechanism may further comprise a spring configured to move the left magnet and the right magnet away from one another to secure the cover to the base. The cover may comprise a button; the button may be configured to move the left magnet toward the right magnet to release the cover from the base. The cover may comprise a button; the button may be configured to (a) move the left magnet toward the button and (b) move the right magnet toward the button to release the cover from the base.

According to an exemplary embodiment as shown schematically in FIGS. 2A-2C, 3A-3C, 4A-4H, 5A-5C, 6A-6H, 7A-7C, 8A-8F, 9A-9F, 10A-10C and 11A-11H, a vehicle interior component configured to be operated by application of an external force from an occupant may comprise a base providing a compartment; a cover movable relative to the base from a closed position to an open position; and a latch mechanism. The base may comprise a fixed magnet fixed to the base. The cover may comprise a moveable magnet moveable relative to the cover. The latch mechanism may be configured to secure the cover to the base. The latch mechanism may comprise the fixed magnet and the moveable magnet. The moveable magnet may be configured to move from an engaged position to a disengaged position to release the cover from the base. The moveable magnet may be generally aligned with and generally parallel to the fixed magnet when the moveable magnet is in the engaged position; the moveable magnet may be generally misaligned with and generally parallel to the fixed magnet when the moveable magnet is in the disengaged position.

According to an exemplary embodiment as shown schematically in FIGS. 2A-2C, 3A-3C, 4A-4H, 5A-5C and 6A-6H, a vehicle interior component configured to be operated by application of an external force from an occupant may comprise a base providing a compartment; a cover movable relative to the base from a closed position to an open position; and a latch mechanism. The latch mechanism may comprise a latch feature configured to secure the cover to the base and a button configured to move the latch feature. The latch feature may be configured to move away from the button to release the cover from the base.

It is important to note that the present inventions (e.g. inventive concepts, etc.) have been described in the specification and/or illustrated in the FIGURES of the present patent document according to exemplary embodiments; the embodiments of the present inventions are presented by way of example only and are not intended as a limitation on the scope of the present inventions. The construction and/or arrangement of the elements of the inventive concepts embodied in the present inventions as described in the specification and/or illustrated in the FIGURES is illustrative only. Although exemplary embodiments of the present inventions have been described in detail in the present patent document, a person of ordinary skill in the art will readily appreciate that equivalents, modifications, variations, etc. of the subject matter of the exemplary embodiments and alternative embodiments are possible and contemplated as being within the scope of the present inventions; all such subject matter (e.g. modifications, variations, embodiments, combinations, equivalents, etc.) is intended to be included within the scope of the present inventions. It should also be noted that various/other modifications, variations, substitutions, equivalents, changes, omissions, etc. may be made in the configuration and/or arrangement of the exemplary embodiments (e.g. in concept, design, structure, apparatus, form, assembly, construction, means, function, system, process/method, steps, sequence of process/method steps, operation, operating conditions, performance, materials, composition, combination, etc.) without departing from the scope of the present inventions; all such subject matter (e.g. modifications, variations, embodiments, combinations, equivalents, etc.) is intended to be included within the scope of the present inventions. The scope of the present inventions is not intended to be limited to the subject matter (e.g. details, structure, functions, materials, acts, steps, sequence, system, result, etc.) described in the specification and/or illustrated in the FIGURES of the present patent document. It is contemplated that the claims of the present patent document will be construed properly to cover the complete scope of the subject matter of the present inventions (e.g. including any and all such modifications, variations, embodiments, combinations, equivalents, etc.); it is to be understood that the terminology used in the present patent document is for the purpose of providing a description of the subject matter of the exemplary embodiments rather than as a limitation on the scope of the present inventions.

It is also important to note that according to exemplary embodiments the present inventions may comprise conventional technology (e.g. as implemented and/or integrated in exemplary embodiments, modifications, variations, combinations, equivalents, etc.) or may comprise any other applicable technology (present and/or future) with suitability and/or capability to perform the functions and processes/operations described in the specification and/or illustrated in the FIGURES. All such technology (e.g. as implemented in embodiments, modifications, variations, combinations, equivalents, etc.) is considered to be within the scope of the present inventions of the present patent document.

The invention claimed is:

1. A vehicle interior component comprising:
(a) a base;
(b) a cover movable relative to the base from a closed position to an open position; and
(c) a latch mechanism configured for an engaged state to retain the cover in the closed position and to be actuated by a button to a disengaged state to release the cover for movement toward the open position;
(d) a spring mechanism configured to actuate the cover toward the open position;
wherein the latch mechanism comprises a magnet arrangement configured for movement within the cover relative to the base for (1) the engaged state when the cover is in the closed position and (2) the disengaged state to release the cover from the closed position;
wherein the button for the latch mechanism is configured (1) to be in a raised position when the magnet arrangement of the cover is in the engaged state and (2) to be pressed to a depressed position to move the magnet arrangement of the cover to the disengaged state;
wherein the magnet arrangement of the base is configured to prevent movement of the button to the raised position
wherein the spring mechanism is configured to actuate the cover from the closed position toward the open position when the magnet arrangement for the cover is in the disengaged state.

2. The component of claim 1 wherein the latch mechanism comprises a magnet arrangement of the base configured to provide the engaged state with the magnet arrangement of the cover when the cover is in the closed position.

3. The component of claim 2 wherein the magnet arrangement of the base comprises a first base magnet and a second base magnet; wherein the first base magnet is configured to retain at least one magnet of the cover in the engaged state, wherein the second base magnet is configured to retain at least one magnet of the cover in the engaged state.

4. The component of claim 2 wherein the magnet arrangement of the cover is configured to be concealed within the cover; wherein the magnet arrangement of the base is configured to be concealed within the base.

5. The component of claim 2 wherein the base comprises a first sidewall and a second sidewall; wherein the magnet arrangement of the base comprises a first base magnet on the first sidewall of the base and a second base magnet on the second sidewall of the base; wherein the magnet arrangement of the cover comprises a first cover magnet and a second cover magnet; wherein the first cover magnet is configured to engage the first base magnet and the second cover magnet is configured to engage the second base magnet.

6. The component of claim 1 wherein the button for the cover comprises a push button configured to actuate a spring arrangement to disengage the magnet arrangement of the cover from the magnet arrangement of the base to release the cover from the base.

7. The component of claim 1 wherein the latch mechanism further comprises a damper for the magnet arrangement of the cover; wherein the damper is configured to slow movement of the magnet arrangement of the cover from the disengaged state to the engaged state.

8. A vehicle interior component comprising:
(a) a base;
(b) a cover movable relative to the base from a closed position to an open position; and
(c) a latch mechanism;
(d) a spring mechanism configured to move the cover toward the open position;
(e) a button for the cover configured to be moved from a raised position to an actuated position to actuate the latch mechanism;
wherein the latch mechanism comprises a magnet arrangement for the cover configured for movement within the cover between an engaged state to retain the cover in the closed position and a disengaged state to release the cover from the closed position;
wherein the magnet arrangement within the cover comprises a first cover magnet and a second cover magnet;
wherein the first cover magnet is configured for movement relative to the second cover magnet to release the cover from the base;
wherein the button is configured to provide the raised position when the magnet arrangement for the cover is in the engaged state and the cover is in the closed position; wherein the magnet arrangement for the base is configured to prevent movement of the button to the raised position
wherein the button is configured to be moved to the actuated position to translate the magnet arrangement for the cover to the disengaged state to actuate the latch mechanism to release the cover from the closed position.

9. The component of claim 8 wherein the first cover magnet and the second cover magnet are configured to engage a magnet arrangement in the base.

10. The component of claim 8 wherein the first cover magnet is configured to move with the second cover magnet to the disengaged state to release the cover from the base so that the spring mechanism can move the cover toward the open position.

11. The component of claim 8 wherein the latch mechanism comprises a linkage; wherein the linkage is configured to link movement of the first cover magnet and the second cover magnet within the cover between the engaged state and the disengaged state.

12. The component of claim 11 wherein the linkage comprises a rack and pinion mechanism.

13. The component of claim 8 wherein the latch mechanism comprises a spring arrangement.

14. The component of claim 13 wherein the button for the cover comprises a push button for the latch mechanism configured to engage the spring arrangement when pressed from the raised position to the actuated position to move the magnet arrangement of the cover into the disengaged state to release the cover from the base.

15. A vehicle interior component comprising:
(a) a base;
(b) a cover movable relative to the base from a closed position to an open position; and
(c) a latch mechanism;
wherein the latch mechanism comprises a magnet arrangement configured for movement within the cover for an engaged state and a disengaged state to release the cover from the closed position;
wherein the cover comprises a button;
wherein the cover comprises an arm configured to be actuated by the button;
wherein the arm is configured to retain the cover to the base until actuated to movement by the button;
wherein the arm is configured for movement from the button to release the cover from the base;
wherein the latch mechanism comprises a magnetic latch;
wherein the magnetic latch comprises the magnet arrangement within the cover and a magnet arrangement comprising at least one magnet for the base;
wherein the magnet arrangement within the cover comprises at least one magnet;
wherein the button is configured to move from a raised position with the cover in the closed position to a depressed position to release the cover from the base;
wherein the magnet arrangement of the base is configured (a) to prevent movement of the button to the raised position; (b) to prevent the cover from moving to the closed position.

16. The component of claim 15 wherein the latch mechanism comprises a magnetic latch; wherein the magnetic latch comprises the magnet arrangement; wherein the magnet arrangement comprises at least one magnet for the arm; wherein the button is configured to actuate the magnetic latch; wherein actuation of the magnetic latch by the button is configured to move at least one magnet of the arm relative to the base to actuate movement of the cover from the closed position to the open position.

17. The component of claim 15 wherein the arm comprises a magnet and the base comprises a magnet; wherein the magnet of the arm is configured to engage the magnet of the base to retain the cover in the closed position; wherein the magnet of the base is configured to repel the magnet of the cover to prevent the cover from moving toward the closed position.

18. The component of claim 15 wherein the button comprises a push button configured to be pressed from the raised position to the depressed position; wherein actuation of the push button comprises movement in a direction generally orthogonal to a direction of movement of the magnet arrangement within the cover.

19. The component of claim 15 wherein the latch mechanism comprises a magnetic latch; wherein the magnetic latch comprises the magnet arrangement within the cover and a magnet arrangement for the base; wherein the magnet arrangement within the cover comprises a magnet comprising at least one magnet segment; wherein the magnet arrangement for the base comprises a magnet comprising at least one magnet segment; wherein the magnet of the cover is configured to engage the magnet of the base to hold the cover in the closed position; wherein the magnet of the base is configured to repel the magnet of the cover to prevent the cover from moving toward the closed position.

20. The component of claim 19 wherein the magnet for the base comprises a magnet segment with a first polarity and a magnet segment with a second polarity.

* * * * *